United States Patent [19]

Hasani et al.

[11] Patent Number: 5,805,808
[45] Date of Patent: Sep. 8, 1998

[54] REAL TIME PARSER FOR DATA PACKETS IN A COMMUNICATIONS NETWORK

[75] Inventors: Santosh K. Hasani, Nashua, N.H.; Satish L. Rege, Groton; Mark F. Kempf, Stow, both of Mass.

[73] Assignee: Digital Equipment Corporation, Maynard, Mass.

[21] Appl. No.: 838,678

[22] Filed: Apr. 9, 1997

Related U.S. Application Data

[63] Continuation of Ser. No. 365,993, Dec. 29, 1994, abandoned, which is a continuation of Ser. No. 814,997, Dec. 27, 1991, abandoned.

[51] Int. Cl.$^6$ .................................................. G06F 13/00
[52] U.S. Cl. ...................................... 395/200.2; 370/392
[58] Field of Search .............................. 395/800, 200.15, 395/200.2, 840, 841, 851, 853, 182.13; 370/252, 351, 353, 389, 392, 401, 402; 380/3, 4, 9, 28, 37, 42, 49, 50

[56] References Cited

U.S. PATENT DOCUMENTS

| | | | |
|---|---|---|---|
| 4,839,891 | 6/1989 | Kobayashi et al. | 370/94 |
| 4,905,138 | 2/1990 | Bourne | 395/650 |
| 4,941,089 | 7/1990 | Fischer | 364/200 |
| 4,979,167 | 12/1990 | McCool | 370/85.4 |
| 4,991,133 | 2/1991 | David et al. | 364/900 |
| 5,056,058 | 10/1991 | Hirata et al. | 364/900 |
| 5,058,110 | 10/1991 | Beach et al. | 370/85 |
| 5,067,104 | 11/1991 | Krishnakumar et al. | 395/375 |
| 5,228,083 | 7/1993 | Lozowick et al. | 380/9 |
| 5,235,644 | 8/1993 | Gupta et al. | 380/40 |
| 5,249,292 | 9/1993 | Chiappa | 395/650 |
| 5,361,353 | 11/1994 | Carr et al. | 395/700 |

*Primary Examiner*—Alpesh M. Shah
*Attorney, Agent, or Firm*—Christine M. Kuta; A. Sidney Johnston

[57] ABSTRACT

A parser for reading bits of a packet has a set of logic circuits implemented in a computer chip; a memory interacting with the computer chip, the memory providing first data to the set of logic circuits; means for reading bits from any field of packet into the set of logic circuits, the bits providing second data to the set of logic circuits; means, responsive to the first data and the second data, for the logic circuits to interpret bits of the packet.

13 Claims, 21 Drawing Sheets

| 15 | 14 | 13 | 12 | 11 | 10 | 9 | 8 | 7 | 6 | 5 | 4 | | 0 |
|---|---|---|---|---|---|---|---|---|---|---|---|---|---|
| PAR | COL | | DIS | HOST | TYPE | | UNK | MD | SOP | EOP | UINDEX | | |

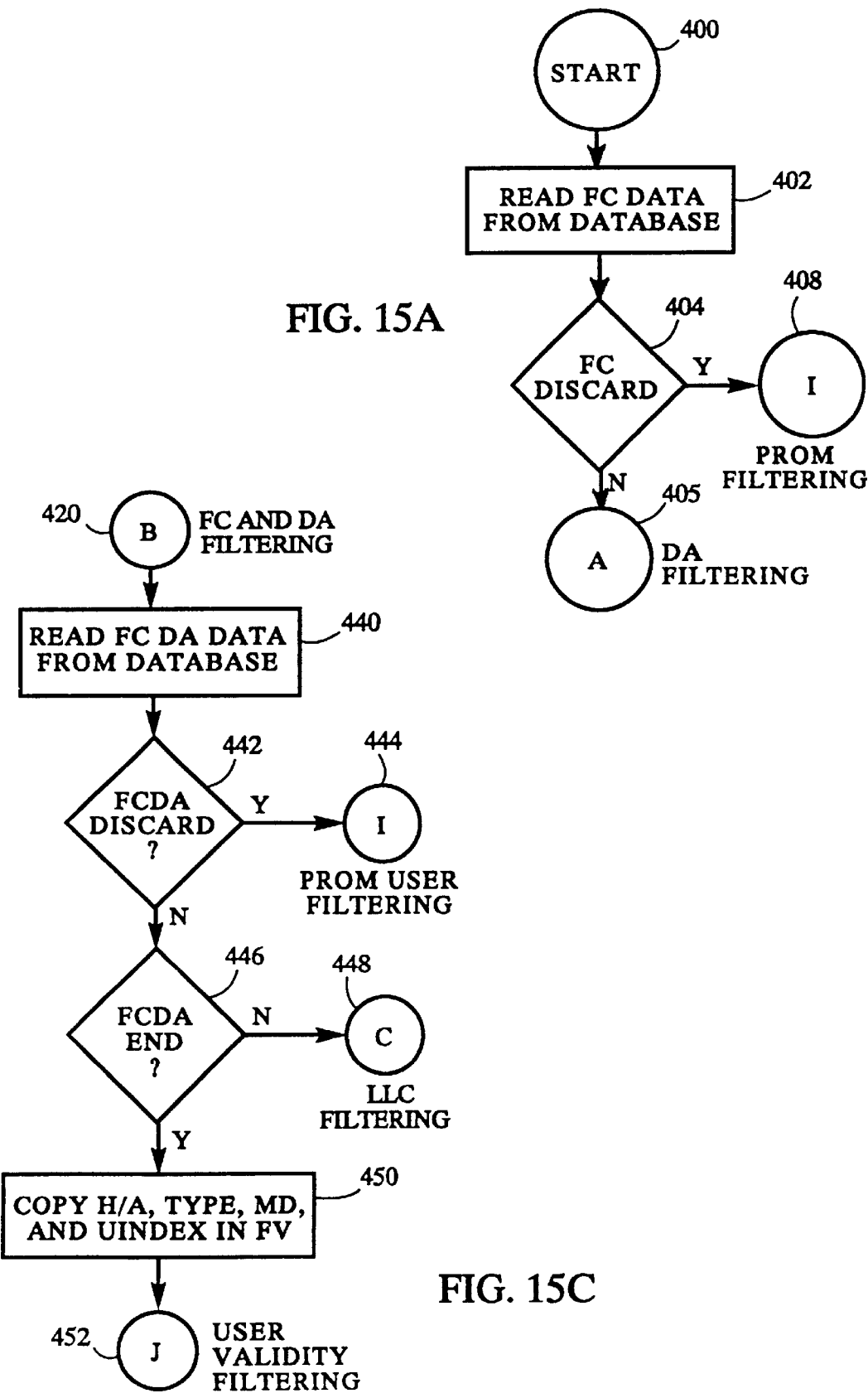

REAL TIME PARSER FOR DATA PACKETS IN A COMMUNICATIONS NETWORK

This is a continuation of Ser. No. 08/365,993, filed Dec. 29, 1994, now abandoned, which is a continuation of Ser. No. 07/814,997, filed Dec. 27, 1991, now abandoned.

FIELD OF THE INVENTION

This invention relates generally to an interface between a communications network and a host computer, and more particularly to a parser for interpreting a packet received from the local area network.

BACKGROUND OF THE INVENTION

When a packet arrives at a host computer from a local area network, the packet must be read and interpreted in order for the host computer to decide what to do with the packet. For example, the host computer may decide that the packet has a destination address not used by the host computer, and in that case the host computer ignores the packet; that is the host detects the packet but does not receive the packet. Alternatively, the packet may be a token, in which case the host computer is given permission to begin transmission. As a further example, the host computer may match the destination address of the packet, and so receive the packet into host computer main memory.

In the above examples, the design of the interface between the host computer and the local area network attempts to read the incoming packet at the speed at which bits of the packet arrive at the interface. A simple match between station addresses used by the host computer and the destination address in the DA field of the packet may be accomplished by hardware using a table of addresses stored in a CAM.

Further, for example, in a FDDI system the frame control field of the packet, the FC field, may be analyzed by the interface through match hardware using a CAM having common values stored in the CAM, where the common values are those commonly used in packet FC fields.

The more difficult problem of analyzing the full content of the packet headers, both the MAC header and the LLC header, where these are the standard IEEE 802.2 headers, remains unsolved as a task which can be accomplished at the rate at which packets may arrive at the host computer in a modern local area network. For example, the standard IEEE 802.2 MAC and LLC headers may contain a maximum of twenty two (22) bytes. Each byte has 8 bits, and so there are a possible two (2) to the 176 power unique combinations of bits. This is approximately 10**53 combinations. A CAM match scheme is unable to provide the required number of combinations.

And in a modern local area network such as the FDDI optical fiber network, bits arrive at the rate of 100 megabits per second, or approximately 450,000 packets per second may arrive at the host computer. This arrival rate of bits is, in some cases, faster than the CPU of the host computer can execute software to read the packets into memory.

A technique employed in the past for analyzing the header bytes of the packet, both MAC and LLC headers, has been to read the packets into adapter memory and then to slowly read the packets out of adapter memory so that adapter software can analyze the header bytes. However, the adapter software is slow: in firstly transferring the bytes to adapter memory; and in secondly analyzing the header bytes of the packet by reading the packets out of adapter memory.

It is desirable to sort and store the packets arriving at a host computer from a modern local area network at the speed at which the bits arrive at the interface.

SUMMARY OF THE INVENTION

A parser for reading bits of a packet has a set of logic circuits implemented in a computer chip; a memory interacting with the computer chip, the memory providing first data to the set of logic circuits; means for reading bits from any field of packet into the set of logic circuits, the bits providing second data to the set of logic circuits; means, responsive to the first data and the second data, for the logic circuits to interpret bits of the packet.

BRIEF DESCRIPTION OF THE DRAWINGS

FIG. 15A, FIG. 15B, FIG. 15C, FIG. 15D, FIG. 15E, FIG. 15F, FIG. 15G, FIG. 15H, FIG. 15I, FIG. 15J, FIG. 15K, and FIG. 15L are a flow chart for the operation of a parser.

DETAILED DESCRIPTION

Figure 1:
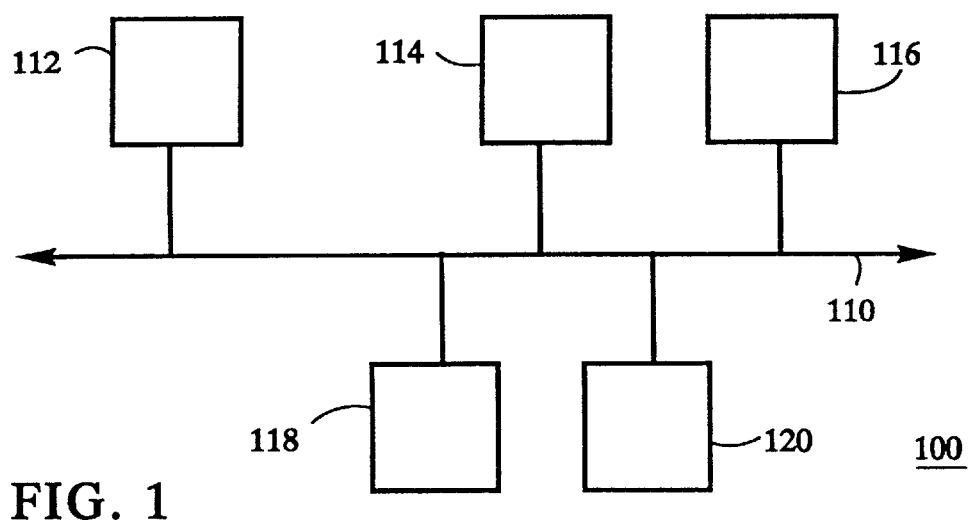
FIG. 1 is a block diagram of a communications network.

Referring now to FIG. 1, there is shown a network 100. Network communications path 110 connects to host computers 112, 114, 116, 118, 120. Host computers 112, 114, 116, 118, 120 communicate with each other by transmitting packets on communications pathway 110. For example, communication path 110 may be an ETHERNET communications pathway, or for example may be a ring type communications pathway such as the FDDI Token Ring Communications System, etc. In any case, a first node, such as host computer 112, may desire to transmit a packet to host computer 120. Host computer 112, then gains permission, through the access protocol for communications pathway 110, to transmit the packet onto communications pathway 110. Host computer 112 then transmits a packet onto communications pathway 110. The packet is detected by each of the host computers connected to the pathway, that is host computer 114, 116, 118, and 120. Because of address information contained within the packet, host computer 120 receives the packet, and the other host computers discard the packet.

In modern communications systems, for example, the FDDI Token Ring System, the bit rate on communications pathway 110 is 100 megabits per second, and as many as 450,000 packets per second may travel on communications pathway 110. Consequently, each host computer 112, 114, 116, 118, 120, must be capable of interpreting the address information, LLC information, and PID information of packets arriving at a wire speed of 100 megabits per second and at a rate of 450,000 packets per second.

Figure 2:
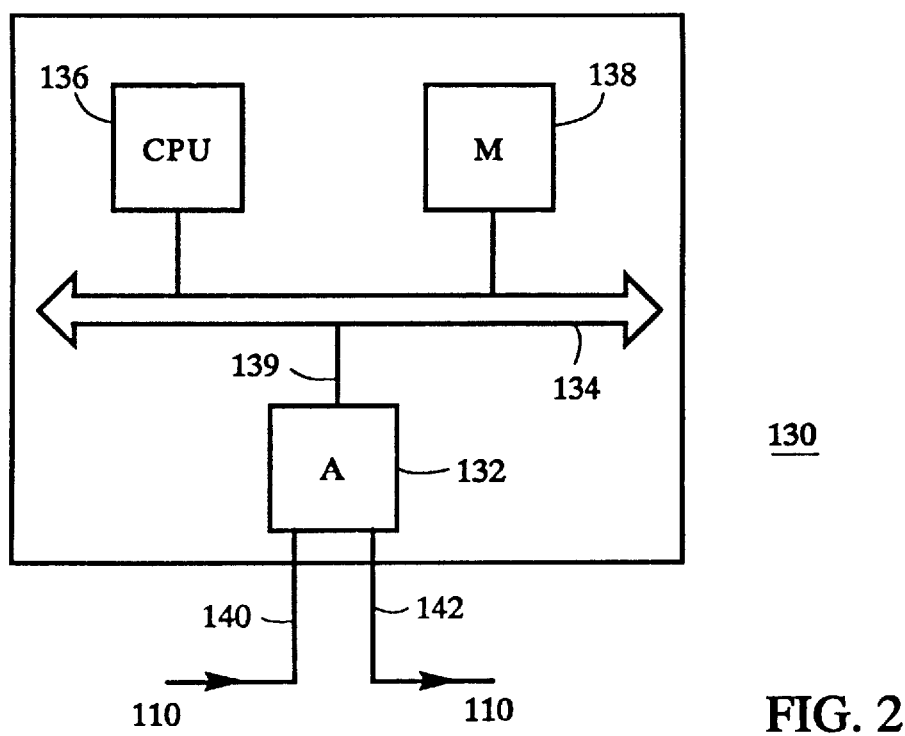
FIG. 2 is a block diagram of a station, or node, on a communications network.

Turning now to FIG. 2, there is shown an internal structure of host computer 130. Host computer 130 may be any host computer such as host computers 112, 114, 116, 118, 120 connected to communications pathway 110. Communications pathway 110 connects to adapter 132. Adapter 132 connects to host computer bus 134. Connected to host computer bus are the various components of host computer 130, including CPU 136 and host computer memory 138.

In operation, the apparatus of FIG. 2 operates as follows. A packet is detected traveling on communications pathway 110 by adapter 132. Adapter 132, based on the addressing information in the packet, determines whether or not host computer 130 should receive the packet. In the event that adapter 132 decides that host computer 130 should not receive the packet, adapter 132 simply does not pass the packet to other units of host computer 130. In the event that adapter 132 decides that the packet should be received by host computer 130, the packet is transferred through connection 139 and host computer bus 134 to host computer memory 138. The present invention provides an improved mechanism, by increasing the information transferred with a packet, for the transfer of packets by adapter 132 to host computer memory 138. Accordingly, the host computer is not required to further process header information from the packets.

Further, in operation, a packet arriving at host computer 130 on communications pathway 110 is stored in a buffer memory in adapter 132. Once adapter 132 determines that the packet to be received by host computer 130, the packet is transferred to a buffer in host computer memory 138. The buffer located in host computer memory 138 is then emptied by a driver program running on host computer CPU 136. A driver program normally operates in host computer CPU 136 to read and empty the buffers in host computer memory 138.

Communications pathway 110 is shown in FIG. 2 as a token ring configuration. Communications pathway 110 enters host computer 130 along leg 140. A packet passing into adapter 132 along leg 140 is repeated by adapter 132 and then departs from host computer 130 along leg 142. From leg 142 the packet re-enters communications pathway 110.

Figure 3:
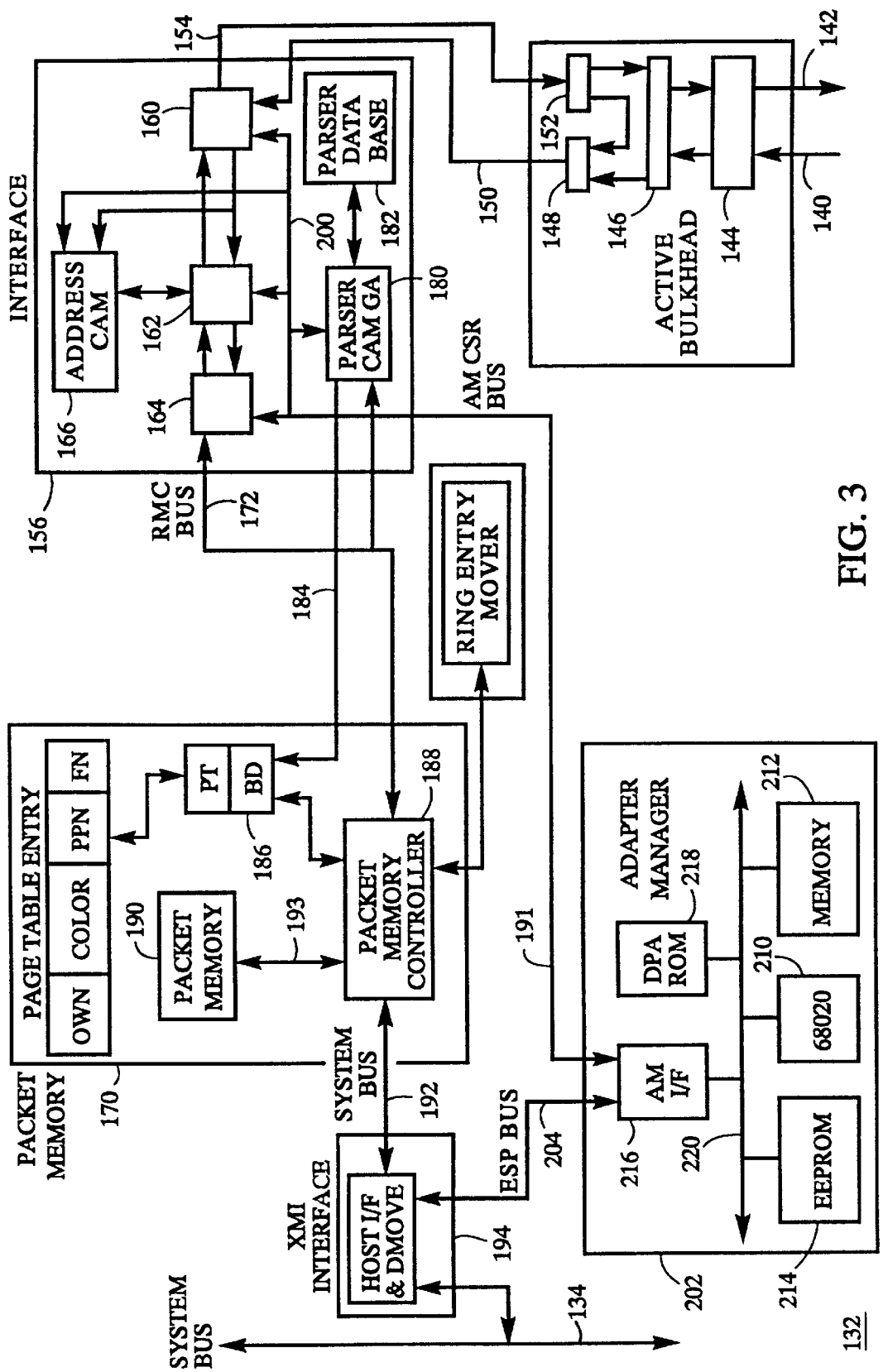
FIG. 3 is a block diagram of an adapter for connecting a host computer of a station to a local area network.

Turning now to FIG. 3, there is shown a block diagram of an adapter 132. A packet enters adapter 132 along leg 140 from communications pathway 110. A packet is repeated and departs from adapter 132 along leg 142 where it re-enters communication pathway 110. Leg 140 and leg 142 as well as communications pathway 110, are, in a preferred embodiment of the invention, an optical fiber communications pathway. Duplex connector 144 couples fiber optical cables of legs 140 and 142 to the combination transmitter and receiver 146. Receive converter 148 transmits the serial bit stream along bus 150.

Transmit converter 152 receives a serial bit stream along bus 154, and transmits the serial bit stream on leg 142 to communications pathway 110.

In receive mode, the serial bit stream on bus 150 is received by interface 156.

Interface 156 manages receipt of packets from communications pathway 110 through leg 140 through a sequence of three gate array computer chips: the elasticity buffer 160; the media access controller 162; and, the ring memory controller 164.

Serial to parallel conversion and parallel to serial conversion occurs at elasticity buffer 160.

An address CAM 166 is used by the media access controller gate array 162 to decode the information carried in the MAC header of an incoming packet. The MAC header of the incoming packet is described more fully hereinbelow with reference to FIG. 5A. The address CAM 166 may be used by the media access controller 162 in order to determine, from the MAC header of the packet, if a packet is to be received by the host computer. Alternatively, the media access controller 162 may be operated in promiscuous mode to accept all packets arriving at the host computer. The FC field is matched through hardwired logic within the media access controller 162.

The DA field may be matched through a simple compare using a CAM to make this decision. In the event that a packet is determined to be one that is not to be received by the host computer, the packet is transferred no further than the media access controller 162. In the event that there is a DA match, the MAC will accept the packet for further filtering by the adapter. The packet is then transferred on ring memory controller bus, RMC bus 172 from ring memory controller 164 to packet memory controller 188.

Parser gate array 180 snoops on RMC bus 172. Parser 180 also is coupled to a local data base, parser data base 182. Parser 180 examines each of the fields of the incoming packet, where the fields are shown in detail in FIG. 5A. The parser, in combination with parser data base 182 and information received concerning the incoming packet on RMC bus 172, generates a forwarding vector. Parser 180 transfers the forwarding vector on line 184 to a control block 186 located in packet memory 170.

The forwarding vector transferred on line 184 controls the disposition of the packet through control of packet memory controller 188. The packet is transferred on RMC bus 172 from ring memory controller 164 to packet memory controller 188. The packet is then stored by packet memory controller 188, into allocated buffers in packet memory 190. In the event that the packet is to be received by the host computer, the packet is then transferred on PMI bus 192, through system bus interface 194 to the system bus, host computer bus 134, as shown also in FIG. 2. By transfer through host computer bus 134, the packet is stored in buffers in host computer memory 138, also as shown in FIG. 2. A driver process running on host computer CPU 136 then reads and empties the buffer in host computer memory 138.

Referring again to interface 156, AM bus 191 provides connection between the adapter manager subsystem 202 and various chips contained in interface 156, including: parser 180; elasticity buffer 160; media access controller 162; and ring memory controller 164. Adapter manager 202 communicates through interface bus 204 with the system bus interface 194.

Adapter manager 202 contains a CPU 210, a local memory 212, an EEPROM 214, an interface 216 to bus 204, an AM bus 191, and a ROM 218. Adapter manager bus 220 provides communication between the internal parts of the adapter manager subsystem 202, that is: CPU 210, memory 212, EEPROM 214, interface 216, and ROM 218.

Figures 4, 6:
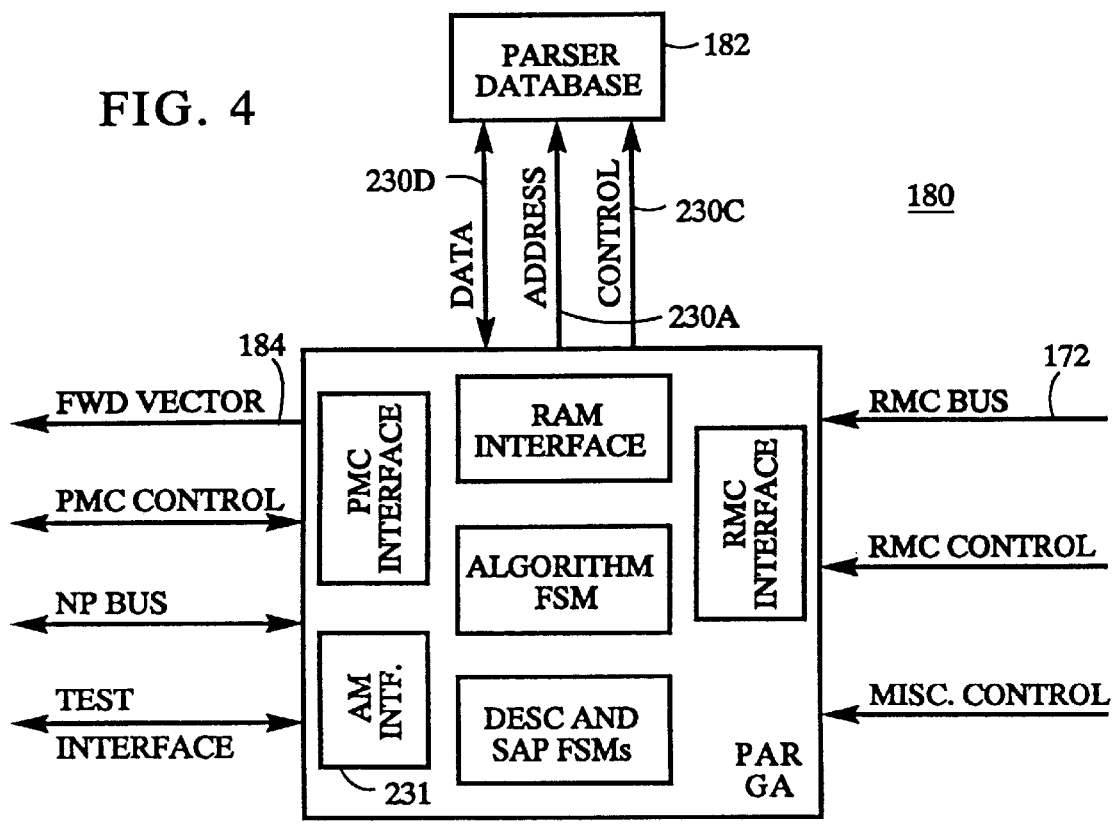
FIG. 4 is a block diagram of a parser gate array.
FIG. 6 is a field diagram of a forwarding vector produced by a parser.

Turning now to FIG. 4, there is shown a parser subsystem block diagram. Parser 180 is shown. Input from RMC bus 172 is shown. Input from the parser data base 182 is shown on lines 230A, 230C, and 230D. Output from the parser is shown on forwarding vector line 184, FWD vector.

In operation, parser 180 utilizes information obtained by snooping on RMC bus 172 in conjunction with data contained in parser data base 182 to produce forwarding vector 184. Forwarding vector 184 then controls the fate of a packet traveling on RMC bus 172 into packet memory controller 188.

Figure 5A:
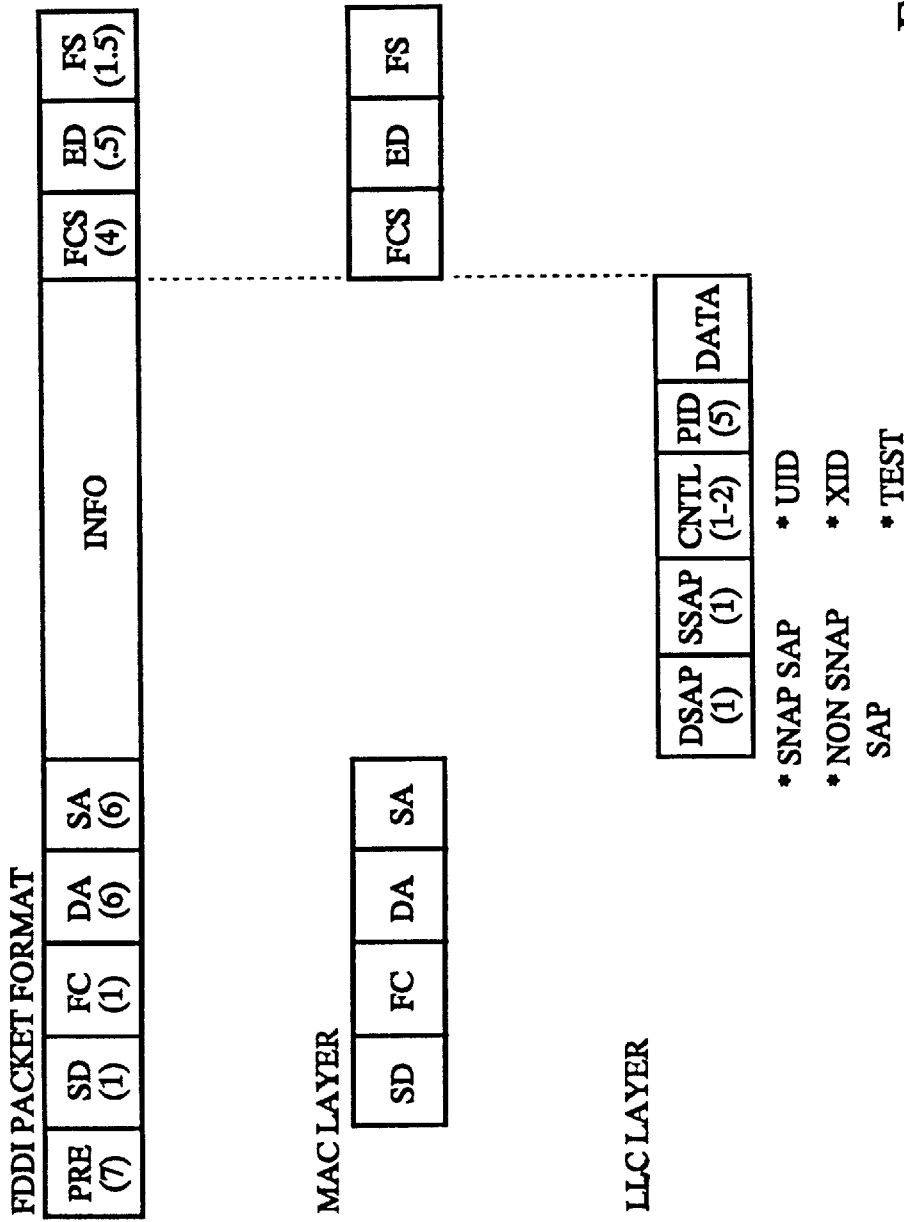
FIG. 5A is a field diagram of the fields of a message traveling on a local area network.

Turning now to FIG. 5A, there is shown the field structure of a packet arriving along leg 140 from communications pathway 110. Parser 180 detects the bits in the fields shown in FIG. 5A by snooping on RMC bus 172. The letter designations shown in the fields depicted in FIG. 5A are a standard terminology utilized in the FDDI Standards by ANSI, and IEEE standard 802.2 for the Logical Link Control for a local area network. The literal designations will be utilized herein as reference numerals referring to the fields. The present example refers to the FDDI Standards and to the IEEE 802.2 Standard, however the invention applies to any standard packet format.

The MAC header fields are next described.

Field PRE is a preamble sequence, typically having 7 bytes.

Field SD is a starting delimiter, and is one byte in length.

Field FC is a function code, and is one byte in length.

Field DA is the destination address of the packet, and is six bytes in length.

Field SA is the source address of the packet and is six bytes in length.

The INFO field contains information for layers higher than the MAC layer of the communications protocol. The INFO field may be of length between 0 bytes and approximately 4,500 bytes.

Next, the MAC trailer fields are discussed.

Field FCS is a frame check sequence and is four bytes in length.

Field ED is an ending delimiter and is ½ byte in length.

Field FS is a frame status field and is one and ½ bytes in length.

The fields SD, FC, DA, SA, and the trailing fields FCS, ED, FS, control the MAC layer of a station such as host computer 130. These fields are interpreted by cooperation between the elasticity buffer 160, the media access controller 162, and the ring memory controller 164. The ring memory controller 164 also provides a count of the number of bytes in a packet, including the bytes in the before mentioned MAC layer fields plus the bytes in the INFO field.

The ring memory controller 164 generates a buffer descriptor based upon interpreting the MAC header fields and trailer fields, counting the bytes in the packet, and verifying the Frame Check Sequence FCS. The buffer descriptor is transferred on RMC bus 172, after the packet transfer completes, to packet memory controller 188.

In an LLC type packet as designated by the FC field, the first few bytes in the INFO field are a Logical Link Control (LLC) level header, and are defined by the IEEE 802.2 standard. The IEEE 802.2 Standard defines three (3) LLC header fields, DSAP, SSAP, and CNTL. The MAC header fields and the Logical Link Control header are interpreted by parser 180. The byte size of the LLC header fields are as follows: DSAP field of 1 byte; SSAP field of 1 byte; CNTL field of either 1 or 2 bytes.

The PID field is present or absent in the packet depending upon the content of the DSAP, SSAP, and CNTL fields. The PID field, when present, immediately follows the LLC header fields.

In the event that the DSAP field has the value of AA hex, (10101010 binary, representing the symbol SNAP), the SSAP field has the value AA hex (representing the symbol SNAP), and the CNTL field has the value 03 hex (representing the symbol UI), then the packet is defined as a SNAP SAP packet. In the event that the packet is a SNAP SAP packet, then the PID field exists. The PID field is five (5) byte in length.

In the event that the packet is not a SNAP SAP packet, the packet is then defined as a NON SNAP SAP packet. The PID field does not exist for a NON SNAP SAP packet.

Figure 5B:
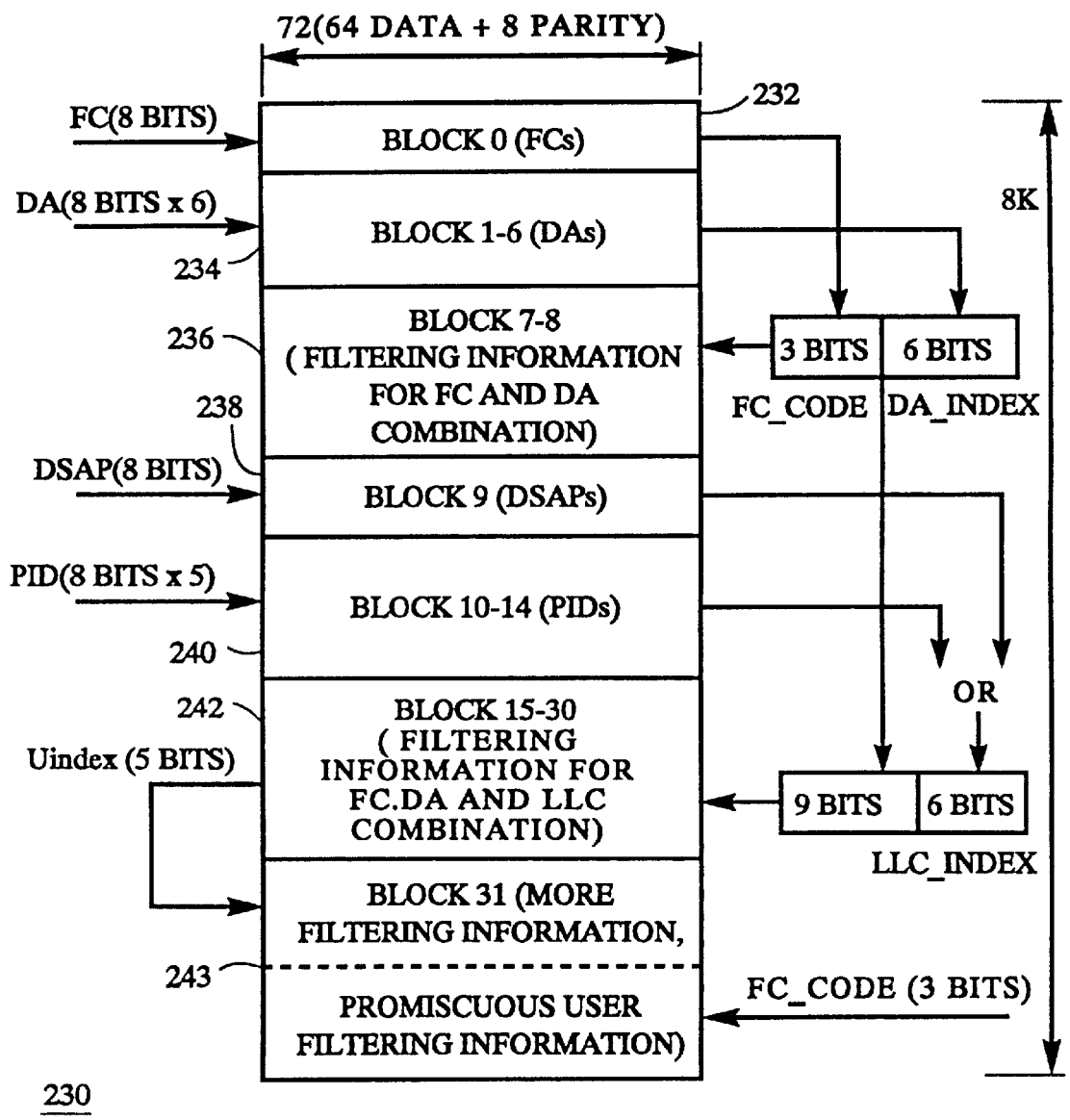
FIG. 5B is a memory diagram for a database for a parser.

Each of the MAC layer, LLC layer, and PID fields contains a variety of allowable data. Parser 180 has as input: the results of reading the MAC layer fields as presented on RMC bus 172; and the results of parser 180 reading the MAC, the LLC header fields, and the PID field of the packet from the RMC bus 172. Parser 180 also has as input a parser database 182. A memory allocation diagram 230 for parser database 182 is shown in FIG. 5B. By comparing the contents of the parser database 182 with the contents of the fields of the packet, the parser creates a forwarding vector for the packet. The forwarding vector is transferred on line 184 to control block 186 of the packet memory, and also to packet memory controller 188. The forwarding vector then determines the fate of the packet by providing information to the packet memory controller 188.

Turning now to FIG. 5B, there is shown a memory allocation diagram 230 of parser database 182. Each block of memory allocation in the parser database 182 is defined as 256 words of 72 bits each. The blocks are numbered and are referred to as BLOCK 0, BLOCK 1, etc. The 72 bits comprise 64 data bits and 8 parity bits. The parser database 182 comprises a Static RAM (SRAM) type memory chip. The SRAM is used as a Content Addressable Memory, a CAM. The use of a SRAM memory chip as a CAM is fully disclosed in the United States patent application of Edgar, entitled "Content Addressable Memory", application Ser. No. 546,414 filed Jun. 29, 1990, all disclosures of which are incorporated herein by reference. The parser database memory is organized in accordance with the memory allocation diagram 230 of FIG. 5B.

As shown in FIG. 5B, the organization of the parser database 182 is outlined. A more detailed description of parser database 182 is given hereinbelow in connection with the description of the operation of the parser database. Section 232, BLOCK 0, of the parser database is allocated to filtering the FC field of the incoming packet. Section 234, BLOCK 1-6, is allocated to filtering the DA field of the incoming packet. Section 236, BLOCK 7-8, is allocated to filtering the FC and DA fields in combination. Section 238, BLOCK 9, is allocated to filtering the DSAP field of the incoming packet. Section 240, BLOCK 10-14, is allocated to filtering the PID field. Section 242, BLOCK 15-30, is allocated to filtering the combination of FC, DA, and DSAP or PID fields. Section 243, BLOCK 31, is allocated to filtering the userindex, UINDEX, and to filtering for a promiscuous user, as is described more fully hereinbelow.

Turning now to FIG. 6, the fields of the forwarding vector are shown. The letter designations in the fields, as shown in FIG. 6, are used for reference numerals. The forwarding vector is the output produced by the parser as a result of filtering the header fields of the incoming packet against parser database 182.

The packet is stored into packet memory 190 in pages of 512 bytes length. In the event that a packet is longer than 512 bytes, the packet is stored in a plurality of pages. A forwarding vector is generated for each page.

PAR field is 1 bit, bit #15. The PAR field is a parity bit, and is used for a parity check for the bits of the forwarding vector as they are parallel transferred on the 16 lines of the forwarding vector line 184.

COL field comprises two bits, bits 14 and 13. The COL field is normally used with the value 01.

DIS field is 1 bit, bit #12. The DIS field is the discard field. The discard field bit may be either set or clear. With one value, the incoming frame on the RMC bus 172 is stored in packet memory 190. If the DIS bit is set to the other value, the incoming frame of line 172 is discarded by packet memory controller 188. That is, the frame is not received for storage in packet memory 190.

HOST field is one bit, bit #11. In the event that HOST bit has the value "1", the packet is destined for the host computer 130, as shown in FIG. 2. In the event that the HOST field bit has the value "0" the packet is destined for the adapter manager subsystem 202.

TYPE field is of length 2 bits, bit 10 and bit 9. Values of the TYPE field and their meanings are as follows:

00 the packet is an XID/Test/Other packet;
01 the associated packet is an SMT/MAC packet;
10 the associated packet is a MOP packet;
11 the associated packet is an error packet.

The TYPE field is used, and is consequently only valid, when the packet is destined for the adapter manager subsystem 202. That is the type field is valid only when the host bit has the value "0".

UNK field is 1 bit in length, bit 8. The UNK bit designates the packet for a particular user defined as the "unknown" user.

MD field is 1 bit in length, bit 7. The MD field indicates that there are multiple recipients for the packet when the MD bit is set.

SOP field is one bit in length, bit 6. The SOP bit indicates the start of the packet, as described below.

EOP field is one bit in length, bit 5. The EOP bit indicates the end of the packet, as described below.

UINDEX field is five bits in length, bit 0, through bit 4. The UINDEX field is the user index. The user index indicates a recipient process in host computer 130 for the incoming packet.

The SOP field and the EOP field indicate to the packet memory controller 188 which page of a packet was received. Each page of a packet causes the ring memory controller 164 to generate a new buffer descriptor corresponding to that page of the packet. The SOP bit and the EOP bit are both copied from the buffer descriptor by the parser reading the RMC bus, and are written to the forwarding vector for that page.

In the event that the packet is a single page packet, then the SOP bit is "set" and the EOP bit is "set".

In the event that the packet is a multiple page packet, then when the packet arrives from the communications pathway 110, as the first page of the packet is transferred on RMC bus 172, the SOP bit is "set", and the EOP bit is "clear". Then as intermediate pages of the packet arrive the SOP bit is "clear" and the EOP bit is "clear". When the last page of the packet arrives the SOP bit is "clear" and the EOP bit is "set". Accordingly, the SOP and EOP fields indicate the page of the packet that last arrived for storage at the packet memory controller along RMC bus 172.

The forwarding vector for each page, a page table entry for that page, and the buffer descriptor are stored in logic block 186.

Operation of the Parser Database

The parser database is loaded by the adapter manager. The contents of the parser database comprise the filtering information used by the parser.

At initialization time, with the help of host computer software running on host computer CPU 136, the adapter manager 202 loads filtering information into the parser database 182. The adapter manager 202 first writes the filtering information into the parser 180, and then logic contained within parser 180 writes the filtering information into the parser database 182. This filtering information contains identification of users available in the host computer to receive packets from the adapter 132, as well as other information as discussed hereinbelow.

At subsequent times the host computer CPU 136 may change the filtering information contained in parser database 182. The filtering information may be changed dynamically in the parser database 182. Dynamically changing filtering information is done by the following steps: first host computer CPU 136 writes new filtering information into adapter manager 202; next the adapter manager writes the new filtering information into the parser 180; then the parser writes the new filtering information into the parser database 182.

In the event that a frame is being filtered at the time that the adapter manager receives new filtering information from the host computer CPU, then the read-write conflict to the parser to database 182 must be resolved.

Figure 18:
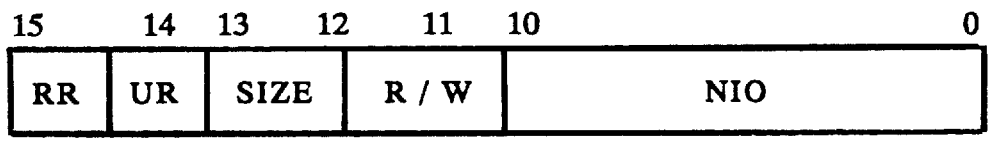
FIG. 18 is a field diagram of a control register.

The UR bit of the control register, FIG. 18, is used to resolve this conflict. The adapter manager starts an update, either read or write, only when the adapter manager finds this bit set to "0". During an update, the adapter manager first loads filtering information into the parser, then resets a USER VALIDITY bit (FIGS. 19 and 20, as discussed further hereinbelow) indicating that the user whose information is being updated is "invalid", and then sets the UR bit to "1".

The parser now loads the filtering information into the parser database 182 as soon as the parser finishes any uncompleted task, and then the parser resets the UR bit to "0" so that the adapter manager 202 can start another update.

Figure 19:
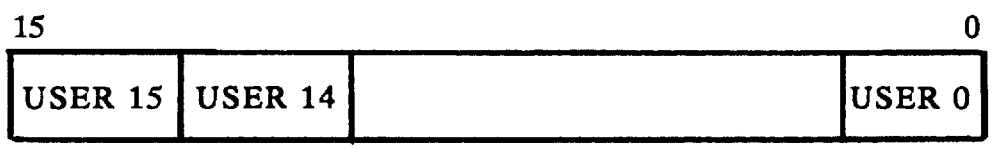
FIG. 19 and FIG. 20 are a field diagram of a user validity register.
Figure 20:

Turning now to FIG. 19 and FIG. 20, there is shown a UVR1 register in FIG. 19 containing bits showing the validity of users 0 through 15. Similarly FIG. 20 shows register UVR2 containing bits showing the validity of users 16 through 31. These users correspond to the users indicated by the user index UINDEX field of the forwarding vector, FIG. 6. When a bit has the value "1", the user is valid, and when the bit has the value "0" the user is not valid. When the host computer detects that a user is no longer available to receive packets, the host computer sets the value of the corresponding user bit to "0". When the host computer detects that there is a new user to receive packets, the host computer sets a corresponding bit to "1".

Frame Control, FC Filtering

Section 232, BLOCK 0, of the parser database is allocated to filtering the FC field of the incoming packet. The FC of a packet is a one byte field (8 bits) which has 256 different possible values. There is one FC entry (64-bit wide) in section 232 of memory for each possible FC value. Hence, there are 256 FC entries. However, these 256 entries are divided into only eight (8) classes. Accordingly, the parser recognizes all eight (8) classes of FC values.

The bits in the FC field of an incoming packet are used to index section 232 of memory. The result obtained from memory is the FC_CODE parameter. The FC_CODE parameter is 3 bits in length. The 3 bit FC_CODE defines the category of packet based upon the FC field, that is whether the packet is a MAC, a SMT, a LLC, a token, etc. Because it is 3 bits in length, the FC_CODE recognizes all eight (8) classes of FC values defined by the FDDI Standard.

Figure 7:
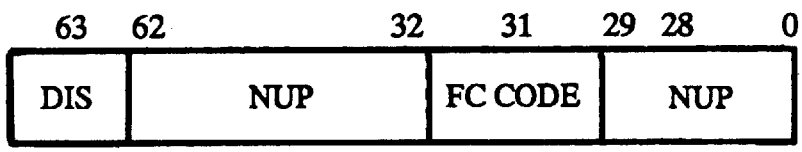
FIG. 7 is a field diagram of an entry in a parser database.

FIG. 7 shows the elements of the FC entries. An FC entry contains the following fields:

BIT <63>: Discard. When this bit is "1", a packet containing that FC is discarded.

BIT <62:32>: Not Used By Parser.

BIT <31:29>: FC_Code. A three bit code describing 8 different classes of Fcs.

BIT <28:0>: Not Used By Parser.

Destination Addresses, DA Filtering

Section 234, BLOCK 1-6, of the parser data base memory is allocated to filtering the DA field of the incoming packet.

The DA field of an incoming packet has six bytes of data. The first byte of the DA field of the incoming packet is used to index the first block of memory in section 234, the second byte is used to index the second block of memory in section 234, and so on.

Each DA entry is 64 bits long. Each DA entry is either sixty four (64) "1"s, or sixty three (63) "1"s and one zero "0". When a zero occurs, the DA entry corresponds to one of the 64 "valid" DAs. The 64 bits of an entry into parser database 182 are referred to as a "bit mask".

The 64 bit "bit mask" obtained from the second byte of DA is logically ORed with the 64 bit mask of the first byte. The resultant is then logically ORed with the third 64 bit mask obtained from the third byte of DA and so on. The final 64 bit mask either has all numeral "1" or a single "0". The all numeral "1" means there is no DA match, and a single numeral "0" means that there is a DA match.

If a zero "0" is found in the same bit position in the six DA entries indexed by the DA field of a packet, the destination address of the packet matched with one of the 64 "valid" DA values.

The six 64 bit DA masks are logically ORed together. The resultant of the logical OR has a zero if all of the six DA entries had a zero "0" at the same bit position. The position of the "0" bit in the resultant gives the "valid" DA value found in the incoming packet DA field.

For example, suppose that the first byte of the DA field of an incoming packet has the value 56 (Decimal), and that a "0" is in the 14th bit position of the 56th entry of the first block of the database. Therefore, the 14th "valid" DA has the value of 56 (Decimal) in the first byte.

Similarly, if a "0" is found in the 14th bit position of all remaining five (5) DA entries corresponding to the remaining five (5) bytes of DA from the packet, then the DA from the packet matches one of the "valid" DAs recognized by the parser.

The bit <63> is assigned to the All MultiCast user.

The DA_INDEX of 6 bits is produced to indicate which of the "valid" DAs was matched to the incoming packet. A six (6) bit index is used because there are 64 possible "valid" DA values.

The final 64 bit mask is then priority encoded to get a 6 bit index, which is known as DA_INDEX. By priority encoding, it is meant that the value of the six (6) bit DA_INDEX gives the bit position of the "0" of the resultant 64 bit mask. For example, assume there is a "numeral 0" in the 18th bit position. This occurrence means that the 18th DA has matched, and as a result of priority encoding a six bit (010010) DA_INDEX is obtained.

The Destination Addresses (DA) field is a six (6) byte field in the packet, and so is a 48 bit address. There are, accordingly, (2 to the 48 power) possible values for DA, or approximately 2.8 10**14 possible DA addresses. The parser is capable of distinguishing 64 DA values. These 64 DA values are referred to as the 64 "valid" DA values.

Figure 8:
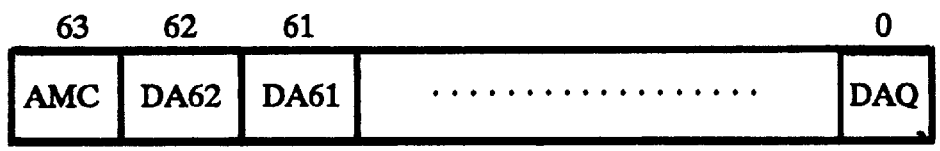
FIG. 8 is a field diagram of an entry in a parser database.

Turning now to FIG. 8, there is shown the format of a DA entry contained in the six (6) blocks of section 234 (FIG. 5B) of DA database. There are 6*256 or 1,536 DA entries in the parser database at section 234 as shown in FIG. 5B.

BIT <63> indicates AMC, the All MultiCast user.

BIT <62> indicates the "valid" destination address DA62.

BIT <61> indicates the "valid" destination address DA61, and so on through bit <0> which indicates "valid" address DA0.

Filtering Data for FC and DA only Filtering

Section 236, BLOCK 7-8, is allocated to filtering the FC and DA fields in combination.

Figure 9:
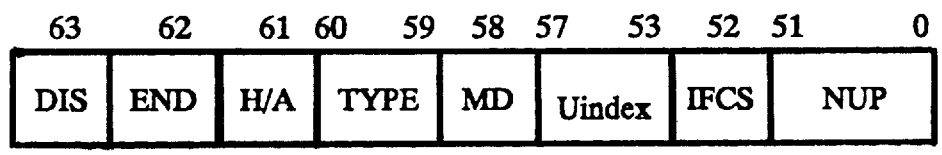
FIG. 9 is a field diagram of an entry in a parser database.

Section 236 contains 512 different combinations of FC and DA, referred to as FC_DA entries. Each FC_DA entry in these blocks gives the final results of the filtering for packets whose filtering is based on FC and DA only. The FC_Code (3 bits), obtained from the FC entry, and the DA_INDEX (6 bits) are concatenated to form a nine (9) bit index. This nine (9) bit index is used to index into section 236 of the database. The 9 bit index has 512 possible values. FIG. 9 shows the format of an FC_DA entry.

BIT <63>: Discard. When this bit is "1", a packet received and containing that combination of FC and DA is discarded.

BIT <62>: End. When this bit is "1", no further filtering is done. The packet is filtered based on only FC and DA fields.

BIT <61>: Host/Adapter Manager. If this bit is "1", the packet is forwarded to Host computer memory 138. If this bit is "0" the packet is forwarded to the adapter manager 202.

BIT <60:59>: Type field. If the packet goes to the adapter manager, this type field shows the type of the packet. This 2-bit field defines four different types of packet 00—XID/Test/Other

01—SMT/MAC

10—MOP

11—Error

BIT <58>: Multiple Destination. If this bit is "1", the packet has multiple destinations. This bit is directly copied to the forwarding vector.

BIT <57:53>: User Index. This five (5) bit field gives the user index of the destination user for the packet. This bit field is directly copied to the forwarding vector at field UINDEX, and is five (5) bits in length. The value of this UINDEX is used to distinguish between processes running on host CPU 136.

BIT <52>: Ignore frame check sequence FCS Error. If this bit is "1", the Parser ignores the FCS CRC error check for the packet. Even if there is an FCS error in the packet, the packet is not marked as an error packet, and the packet is forwarded to its destination.

BIT <51:0>: These Bits Are Not Used By the parser.

LLC Filtering

Section 238, BLOCK 9, is allocated to filtering the DSAP field of the incoming packet.

LLC filtering is based upon the DSAP, the SSAP, the CNTL, and the PID fields of the incoming packet. An incoming packet is filtered on either the DSAP field or, in case of a SNAP SAP packet, the PID field. The parser implements 64 combinations of DSAP and PID, corresponding to the 64 bit positions in both the DSAP entry and the PID entry in the parser database.

The SAP FSM determines whether the incoming packet is a SNAP SAP or NON SNAP SAP packet based on the values of the following fields: DSAP; SSAP; CNTL fields of the incoming packet. The fields are in the LLC header of the incoming packet as shown in FIG. 5A.

The packet is a NON SNAP SAP packet in the event that it is not a SNAP SAP packet. Filtering of a NON SNAP SAP packet is based upon the DSAP field of the incoming packet.

DSAP Field Filtering

The DSAP field of the packet is one byte in length. Accordingly the DSAP section, section 238, of the parser database memory 182 is one block of memory having 256 entries. The parser can distinguish 64 values from the DSAP field, corresponding to the 64 bits in a DSAP entry.

The value of the DSAP field of the packet is used to index DSAP entries in the DSAP section of memory, section 238. A zero "0" in any bit position of a DSAP entry indicates that the DSAP is valid. A valid DSAP value in the field of the incoming packet indexes a 64 bit DSAP entry having 63 "1" values and one "0" value, where the bit position of the "0" indicates the "valid" DSAP value.

Figure 10:
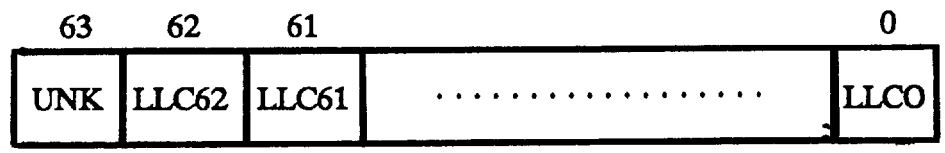
FIG. 10 is a field diagram of an entry in a parser database.

FIG. 10 shows an entry in memory section 238. In FIG. 10, each entry has one bit indicating which valid DSAP value was selected by the DSAP field of the packet.

BIT <63> of a DSAP entry is designated for the Unknown User. The existence of an Unknown User is verified via a Control Register provided in the AM interface 231 of the parser (FIG. 4).

The valid positions are labelled "LLC62", "LLC61", etc. because the DSAP and PID filtering is combined, and referred to as LLC filtering.

Protocol IDentifications, PID, Field Filtering

Section 240, BLOCK 10-14, is allocated to filtering the PID field.

Figure 11:
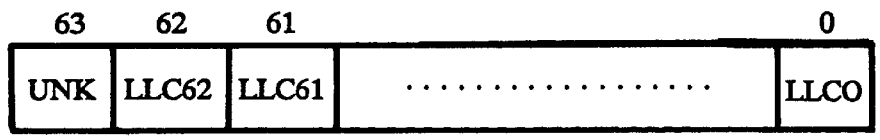
FIG. 11 is a field diagram of an entry in a parser database.

LLC filtering based on PID is required for SNAP SAP packets. The Protocol IDentifier field, PID, of the packet is five (5) bytes long. FIG. 11 shows a PID entry in the parser database, found in PID section 240 of FIG. 5B. The description of PID section 240 is similar to the description for the destination addresses, DA section 234, except that the PID section 240 has five blocks of memory rather than six (6), corresponding to the PID field of the packet. Also, BIT <63> in each entry is reserved for the Unknown user.

The DSAP entries and PID entries are two mutually exclusive filtering fields. That is, a packet is either filtered on DSAP or on PID. For a SNAP SAP packet the filtering is based upon the five (5) bytes of PID. For a NON SNAP PACKET the filtering is based on one byte of DSAP. From the DSAP and the PID fields, the parser supports 64 unique values.

A six bit LLC_INDEX is created to indicate which of the 64 "valid" values of DSAP or PID fields were selected from the parser database. The LLC_INDEX is said to indicate "LLC Combination" filtering, where the combination is either from the DSAP or the PID fields of the incoming packet.

The result of a read of these fields in combination with the section 238 of parser database memory provides a 64 bit mask. This bit mask has either all "1" meaning no match or a single "0" meaning a match. This bit mask is then priority encoded to get a 6 bit quantity referred to as the LLC_INDEX. If a packet is a SNAP SAP packet, the 5 bytes of PID from the LLC header as shown in FIG. 5A, are used to index 5 blocks of memory, section 240, allocated to PID, BLOCK 10–BLOCK 14. Similar ORing operations are performed as in the case of DA to obtain a final 64 bit mask. Again the priority encoding of this 64 bit entry provides a 6 bit LLC_INDEX.

Filtering Data for FC, DA and LLC Combination Filtering

Section 242, BLOCK 15-30, is allocated to filtering the combination of FC, DA, and DSAP or PID fields.

Figure 12:
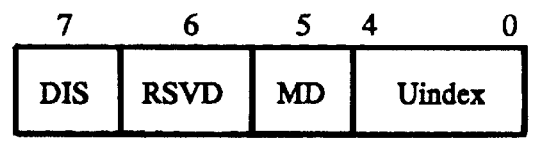
FIG. 12 is a field diagram of an entry in a parser database.

FC, DA, and LLC combination filtering is assigned 16 blocks of parser database memory, meaning 32K bytes of memory, at section 242. Each block within blocks 242 is referred to as a FC_DA_LLC entry. The FC_Code (3 bits), the DA_INDEX (6 bits), and the LLC_INDEX (6 bits), are concatenated to form a 15 bit index This 15 bit index is used to index one of the 32K FC_DA_LLC entries. Each FC_DA_LLC entry is one byte of information. FIG. 12 shows the format of an FC_DA_LLC entry.

BIT <7>: Discard. When this bit is "1", the packet containing this combination of FC, DA and LLC is discarded.

BIT <6>: Not Used By Parser.

BIT <5>: Multiple Destination. If this bit is "1", the packet has multiple destination users. This bit is directly copied to the forwarding vector.

BIT <4:0>: User Index. This five (5) bit field gives the user index of the destination user for the packet. This bit field is directly copied to the forwarding vector at field UINDEX, and is five (5) bits in length. The value of UINDEX is used to distinguish between processes running on host CPU 136 (FIG. 6).

UINDEX Filtering

UINDEX Filtering is done in order to determine characteristics of a particular user. UINDEX Filtering is for a Particular User, and is based on the UINDEX obtained from FC, DA and LLC Combination Filtering.

Section 243, BLOCK 31, is allocated to filtering the userindex, UINDEX, and to filtering for a promiscuous user.

Figure 13:
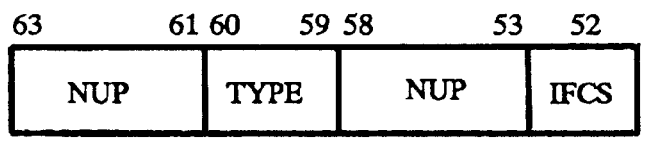
FIG. 13 is a field diagram of an entry in a parser database.
Figure 13:
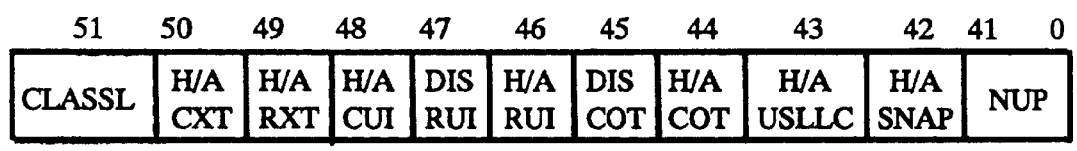

After a user index UINDEX is determined from the filtering done with FC, DA, and LLC, parsing continues in order to obtain further information about the user indicated by UINDEX. This continuing parsing is based on information in user entries contained in section 243 of the parser database. Section 243 has 256 entries of 64 bits each. The UINDEX is used to index this section of memory. Only 32 user entries are used since the UINDEX has only five (5) bits. FIG. 13 shows the fields of these 32 user entries.

BIT <63:61>: Not Used By Parser.

BIT <60:59>: Type. If the packet goes to the adapter manager, this type field shows the type of the packet. This 2-bit field defines four different types:

00—XID/Test/Other
01—SMT/MAC
10—MOP
11—Error

BIT <58:53>: Not Used By Parser.

BIT <52>: Ignore FCS CRC Error. Ignore frame check sequence FCS Error. If this bit is "1", the Parser ignores the FCS CRC error check for the packet. Even if there is an FCS error in the packet, the packet is not marked as an error packet, and the packet is forwarded to its destination.

BIT <51>: Class 1. When this bit is "1", the user is in Class I LLC mode of operation, as defined in the IEEE 802.2 Standard. Otherwise the packet is in User Supplied LLC mode.

BIT <50>: Host/AM for Command XID/Test, as defined in the IEEE 802.2 Standard. If the packet is a command XID/Test, then this bit is "1", and the packet is forwarded to the Host computer. If this bit is "0", the packet is forwarded to the Adapter Manager 202.

BIT <49>: Host/AM for Response XID/Test, as defined in the IEEE 802.2 Standard. If the packet is a response XID/Test, then this bit is "1", and the packet is forwarded to the Host computer memory 138. If this bit is "0", the packet is forwarded to the Adapter Manager 202.

BIT <48>: Host/AM for Command UI, as defined in the IEEE 802.2 Standard. If this packet is a command UI, then this bit is "1", and the packet is forwarded to the Host computer. If this bit is "0", the packet is forwarded to the Adapter Manager 202.

BIT <47>: Discard for Response UI, as defined in the IEEE 802.2 Standard. If the packet is a response UI, then this bit is "1", and the packet is discarded.

BIT <46>: Host/AM for Response UI, as defined in the IEEE 802.2 Standard. If the packet is a response UI computer, then this bit is "1", and the packet is forwarded to the Host. If this bit is "0", the packet is forwarded to the Adapter Manager 202.

BIT <45>: Discard for Control_Other. If the packet has a control field which is neither UI nor XID/Test and this bit is "1", the packet is discarded, otherwise the packet is forwarded to the adapter manager.

BIT <44>: Host/AM for Control_Other. When this bit is "1", Control_Other, which is neither UI nor XID/Test, packets are forwarded to the Host, otherwise the packet is forwarded to Adapter Manager.

BIT <43>: Host/AM for User Supplied Mode, as defined in the IEEE 802.2 Standard. If the bit <51> is "0" and this bit is "1", the packet is forwarded to the Host, otherwise if this bit is "0", the packet is forwarded to Adapter Manager.

BIT <42>: Host/AM for SNAP SAP packets. If the packet is a SNAP SAP, and this bit is "1", the packet is forwarded to the Host. If this bit is "0", the packet is forwarded to the adapter manager, AM.

BIT <41:0>: Not Used By Parser.

Filtering Data for Promiscuous User(s)

Section 243, BLOCK 31, is allocated to filtering the userindex, UINDEX, and to filtering for a promiscuous user.

Promiscuous filtering is done after each discard condition. Refer to Parsing logical flow, FIG. 15A–FIG. 15L, for various discard situations. In the case where the packet has been determined to go to a particular user(s), promiscuous filtering is omitted.

There are eight (8) promiscuous entries, corresponding to the eight (8) recognized FC classes. The FC_Code is used to index the eight promiscuous entries. Each promiscuous entry is 64 bits in length.

Figure 14:
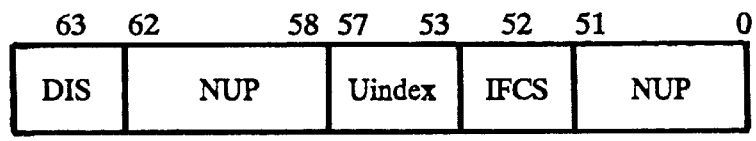
FIG. 14 is a field diagram of an entry in a parser database.

FIG. 14 gives the fields of promiscuous entries:

BIT <63>: Discard. When this bit is "1", the packet is discarded. The "1" shows that there is no promiscuous user.

BIT <62:58>: Not Used By Parser.

BIT <57:53>: User Index. If the packet goes to the Host, this bit field gives the user index of the Promiscuous user which is to receive the packet. This bit field is directly copied to the forwarding vector (FIG. 6).

BIT <52>: Ignore FCS CRC Error. Ignore frame check sequence FCS Error. If this bit is "1", the Parser ignores the FCS CRC error check for the packet. Even if there is an FCS error in the packet, the packet is not marked as an error packet, and the packet is forwarded to its destination.

BIT <51:0>: Not Used By Parser.

Turning now FIG. 15A through FIG. 15L there is shown a flowchart for parser operation. The operation of the parser starts at block 400. At block 402 the FC portion of the parser database, section 232, is read with the contents of the FC field of the MAC header of the incoming packet. At block 404 a decision to discard the packet is made, on the basis of the read from block 402. In the event that the decision is to not discard the packet based upon the FC read at block 402, then the parser branches to block 405 in order to proceed to "DA filtering". In the event that the decision to discard at block 404 is "yes", then the parser branches to promiscuous filtering at block 408.

Figure 15B:
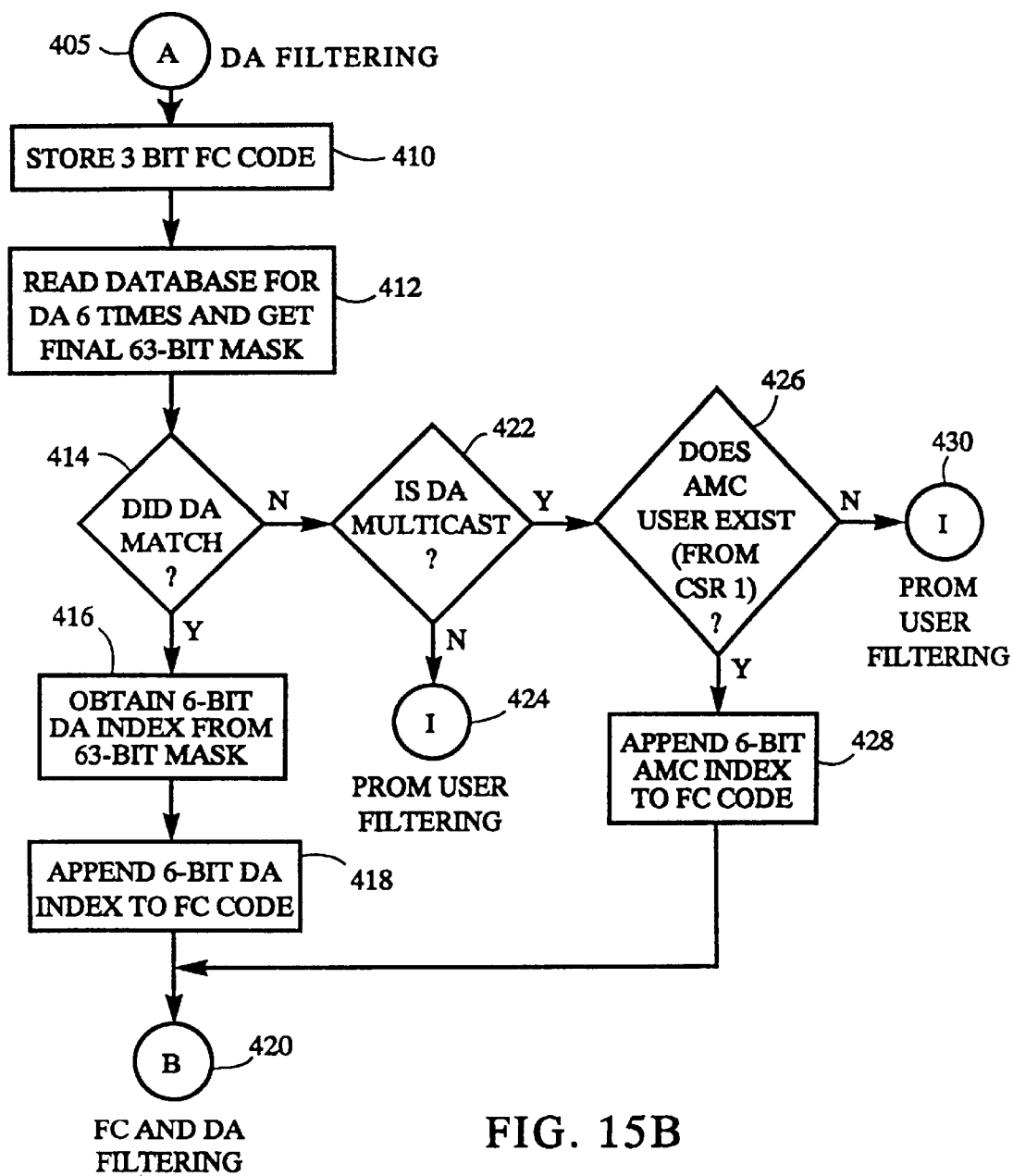

Turning now to FIG. 15B, the logical flow for "DA filtering" is shown. At block 405 of FIG. 15B, the parser proceeds from block 405 of FIG. 15A, and these two blocks are identical. At block 410 the three (3) bit FC CODE is stored. This three bit FC CODE is generated at block 402. At block 412 the parser reads the parser database section 234 for the six bytes of the DA field of the incoming packet. A 64 bit mask is obtained from the logical OR operations between the indexed 64 bit words from section 234 of the parser database memory as described herein-above.

At block 414 a decision is made: "Did DA match?", in which the decision determines whether or not the destination address field in the packet matched one of the 64 "valid" DA values available for the parser to match. In the event that the answer to the question is "yes", the parser proceeds to block 416. At block 416 the parser generates a six bit DA_INDEX from the 64 bit mask obtained at block 412. After creating the six bit DA_INDEX the parser proceeds to block 418. At block 418 the six bit DA_INDEX is appended to the 3 bit FC_CODE created at block 410. The result of the operation at block 418 is to create a nine (9) bit code for further parsing. The parser then proceeds to block 420.

In the event that the answer to the question: "Did DA match?" at block 414 is "no", then the parser proceeds to block 422. At block 422 the parser asks the question: "Is DA a multicast address?". In the event that the answer is "no", the parser proceeds to block 424, at which point the processor branches to promiscuous user filtering.

In the event that the answer at block 422 is "yes", the DA of the incoming packet is multicast, then the parser branches to block 426. At block 426 the parser asks the question: "Does the All Multi Cast (AMC) user exist?". In the event that the answer is "yes", then the parser branches to block 428 at which point the six (6) bit DA INDEX is generated and appended to the FC_CODE created at block 410. The operation of block 428 generates a 9 bit code for further parsing.

In the event that the answer to the question at block 426, "Does AMC user exist?" is "no", then the parser branches to block 430 and proceeds to promiscuous user filtering.

Turning now to FIG. 15C, there is shown the logical flow for "FC DA filtering". The parser branches from block 420 of FIG. 15B to block 420 of FIG. 15C, where the same block is represented in both figures. The parser proceeds from block 420 to block 440.

At block 440 the parser reads the FC DA combination data stored at section 236 of FIG. 5B from the parser database. The parser proceeds to block 442. At block 442 the question is asked: "FC DA discard?".

In the event that the answer to the question at block 442 is "yes", the parser proceeds to block 444. At block 444 the parser branches to the promiscuous user filtering.

In the event that the answer to the question of block 442 is "no", the parser branches to block 446. At block 446 the question is asked: "FC DA end meaning does filtering end with FC and DA filtering?". In the event that the answer to the question of block 446 is "no", the parser branches to block 448. At block 448 the parser branches to LLC filtering.

In the event that the answer to the question of block 446 is "yes", the parser branches to block 450. At block 450 the following fields are copied into the forwarding vector, field H/A, field TYPE, field MD, and field UINDEX. Referring now to FIG. 6, field H/A is the Host field, bit 11; field TYPE is the field of bits 10 and 9. Field MD is bit 7. Field UINDEX is the field of bits <4:0>.

Upon completion of the operations of block 450 the parser branches to block 452 and proceeds to "User Validity Filtering".

Figure 15D:
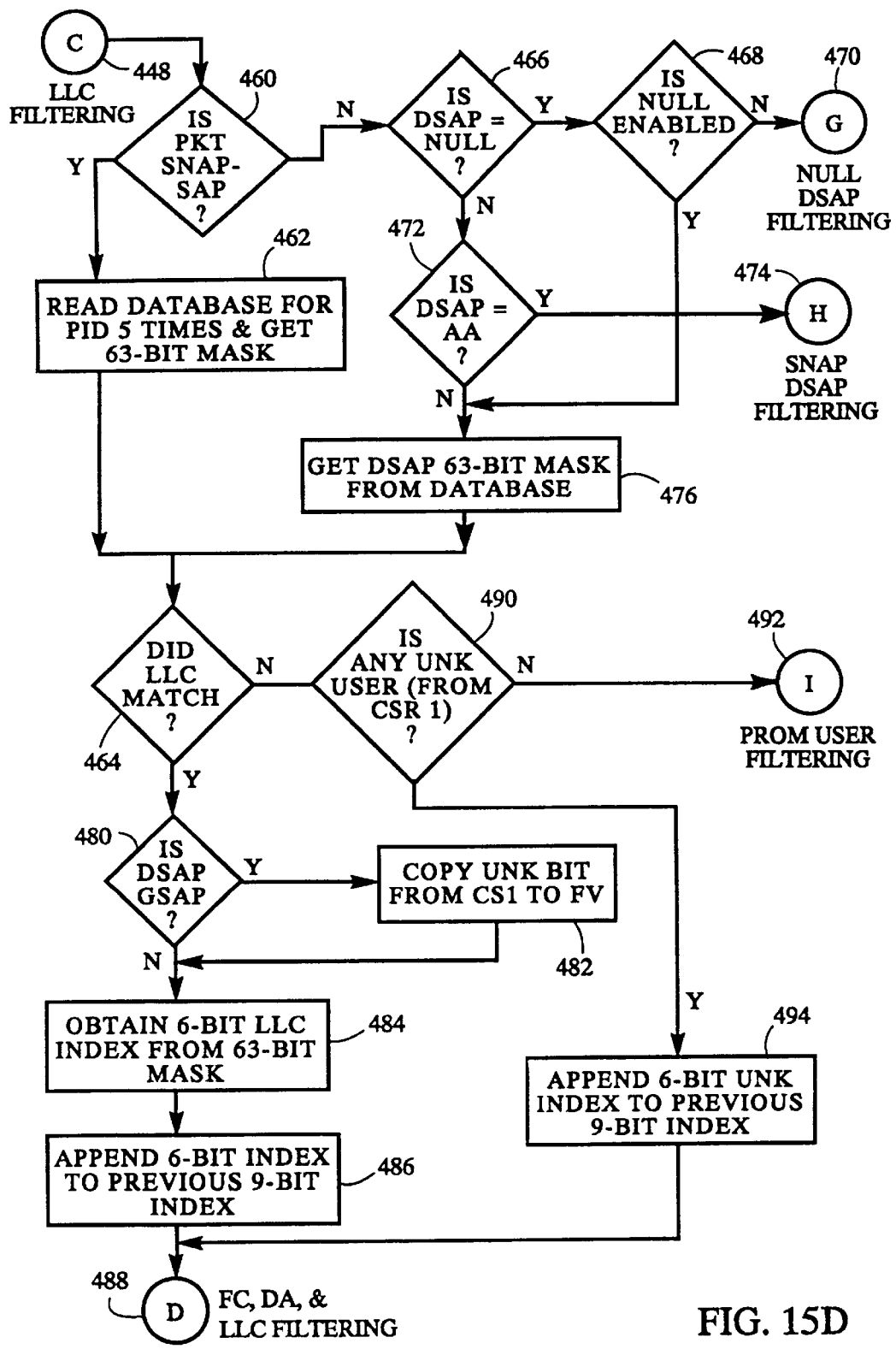

Turning now to FIG. 15D, from block 448 in FIG. 15C, the parser branches to block 448 in FIG. 15D, where the same block appears in both figures.

From block 458 the parser branches to block 460. At block 460 the question is asked: "Is the packet a SNAP-SAP?". In the event that the answer to the question of block 460 is "yes", the parser branches to block 462. This determination of SNAP SAP is done by hardwired logic which uses the values of the fields DSAP, SSAP, and CNTL.

At block 462 the parser reads the database for the PID datafields, section 240 of FIG. 5B. Five PID data blocks are read from section 240. Also, logical OR operations to decode the PID field of the packet occur at block 462. The result is to obtain a 64 bit mask from block 462 the parser proceeds to block 464.

In the event that the answer to the question of block 460 is "no", the parser proceeds to block 466. At block 466 the question is asked: "Is DSAP=NULL?". In the event that the answer to question at block 466 is "yes", the parser proceeds to block 468. At block 468 the question is asked: "Is NULL enabled, meaning that a user with the DSAP field equal to NULL (00000000) is enabled?". In the event that the answer to the question of block 468 is "no", the parser proceeds to block 470, from which the parser proceeds to "NULL DSAP filtering".

In the event that the answer to the question at block 466 is "no", the parser proceeds to block 472. At block 472 the question is asked: "Is DSAP=AA?". In the event that the answer to the question of block 472 is "no", the parser proceeds to block 476.

At block 476 the parser reads a 64 bit DSAP mask from the database at section 238. From block 476 the parser proceeds to block 464.

In the event that the answer to the question at block 472 is "yes", then the parser proceeds to block 474 to do SNAP DSAP filtering.

At block 464, the question is asked: "Did LLC match?", meaning that the 64 bit mask from block 462 or block 476 had one "0" value kit. In the event that answer to the question of block 464 is "yes", the parser proceeds to block 480. At block 480 the question is asked: "Is DSAP GSAP, meaning group SAP, a particular value defined by IEEE 802.2?". In the event that answer to the question at block 480 is "yes", the parser proceeds to block 482. At block 482 the parser copies the unknown bit, UNK bit, from a control and status register to the forwarding vector. Referring to the forwarding vector, the UNK bit is bit 8 as shown in FIG. 6. After the operation of block 482 completes, the parser proceeds to block 484.

In the event that the answer to the question of block 480 is "no", the parser proceeds to block 484. At block 484 a 6 bit LLC_INDEX is created from the 64 bit mask LLC mask. The 64 bit mask is obtained from either block 462 or from block 476.

Upon completion of the step at block 484, the parser proceeds to block 486. At block 486 the 6 bit LLC_INDEX is appended to the previous 9 bit index obtained at block 418. At block 486 the appending of the 6 bit LLC index and the 9 bit index obtained at 418 produces a 15 bit index. Upon completion of the operation of block 486 the parser proceeds to block 488.

Returning now to block 464 in the event that the answer to the question of block 464 is "no", the parser proceeds to block 490. At block 490 the question is asked: "Is there any UNK user?". In the event that the answer to the question at block 490 is "no", the parser proceeds to block 492 and enters promiscuous user filtering. In the event that the answer to the question at block 490 is "yes", the parser proceeds to block 494.

At block 494 a 6 bit UNK index is appended to the nine (9) bit index obtained at block 418. A 15 bit index is created at block 494. Upon completion of the operation at block 494 the parser proceeds to block 488.

Figure 15E:
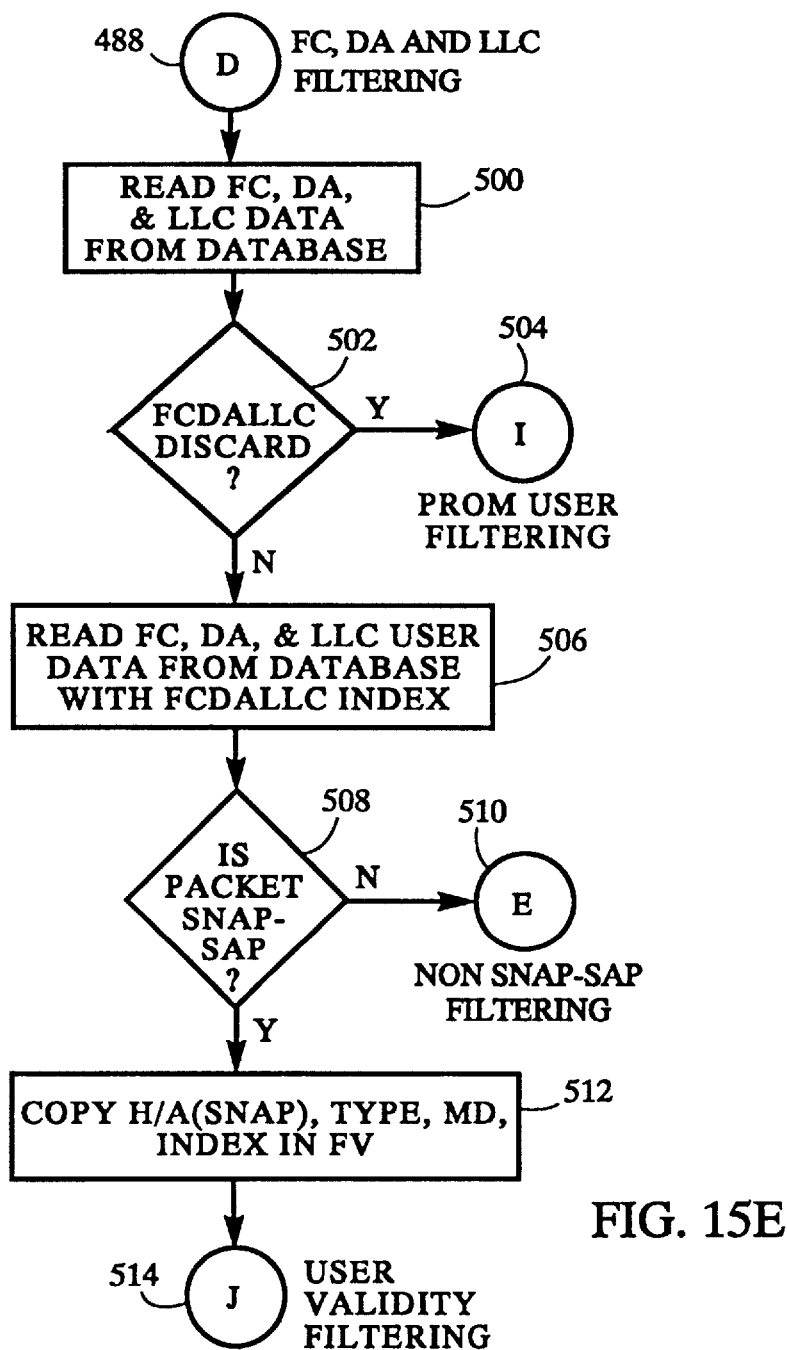

Turning now to FIG. 15E, the parser proceeds to block 488 as shown on FIG. 15E. From block 488 as shown on FIG. 15E, the parser proceeds to block 500. At block 500 the parser reads from the parser database at section 242 the filtering information for the FC, DA, and LLC combination filtering.

At block 500 data is read from the database with the 15 bit index produced at block 486. The read with the 15 bit index results in reading a byte as shown in FIG. 12.

Upon completion of the operation of block 500 the parser proceeds to block 502. At block 502 the discard condition of the 64 bit mask is tested and the following question is asked: "Is the packet to be discarded?". In the event that the answer to the question of block 502 is "yes", the parser proceeds to block 504 where the parser enters promiscuous user filtering.

In the event that the answer to the question of block 502 is "no", the parser proceeds to block 506. At block 506 the parser reads the user data from the database using the results of the indexed read at block 500.

Upon completion of the operation of block 506 the parser enters block 508. At block 508 the following question is asked: "Is the packet a SNAP-SAP?". In the event that the answer to the question asked at block 508 is "no", the parser goes to block 510. At block 510 the parser enters "NON-SNAP-SAP filtering".

In the event that the answer to the question of block 508 is "yes", the parser proceeds to block 512. At block 512 the following fields are copied to the forwarding vector, field H/A, field TYPE, field MD, and field INDEX.

Upon the completion of the operation of block 512 the parser proceeds to block 514. At block 514 the parser enters "User Validity Filtering".

Figure 15F:
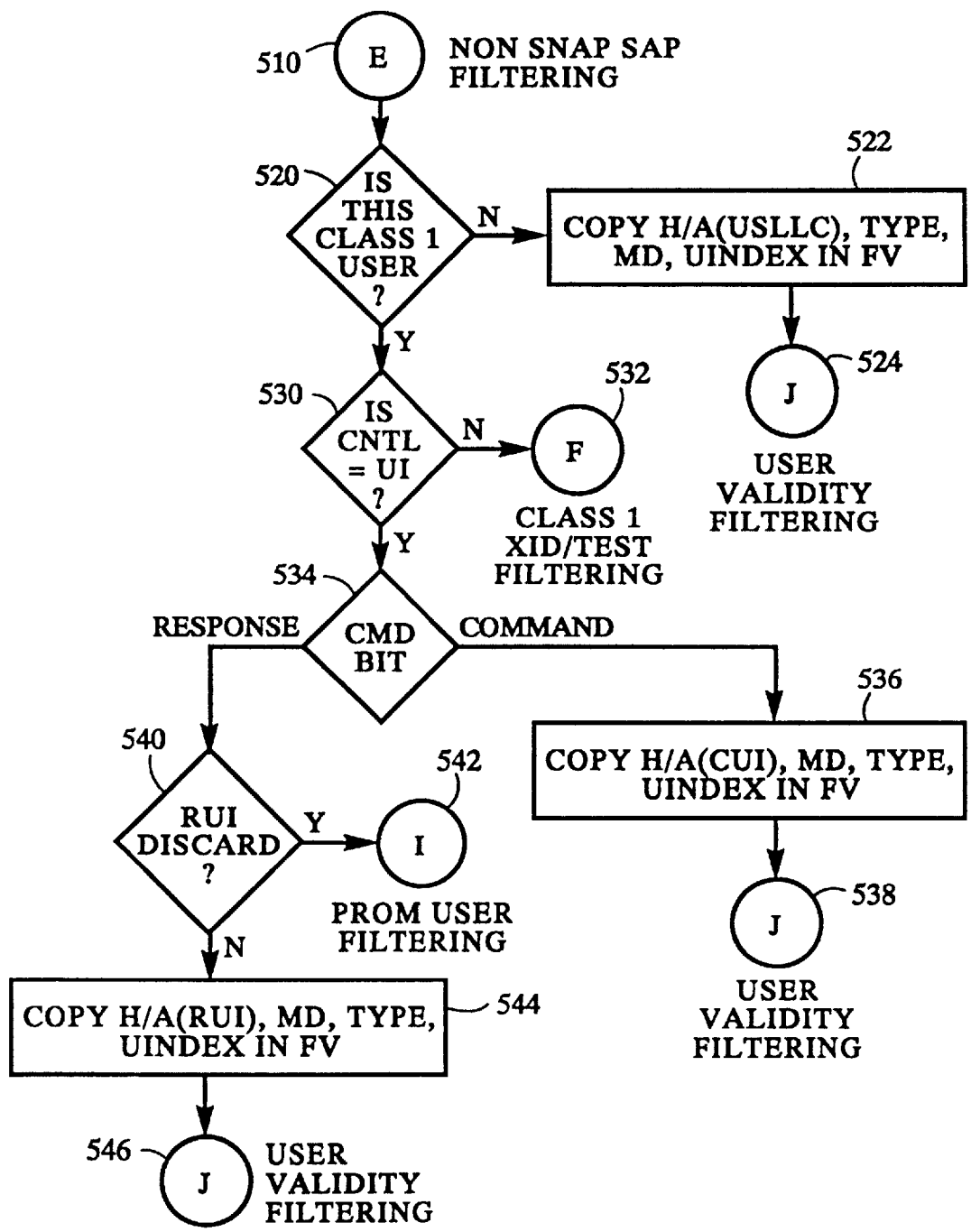

Turning now to FIG. 15F, there is shown block 510. When the parser enters block 510 as shown in FIG. 15E, the parser proceeds to block 510 as shown on FIG. 15F. From block 510 the parser enters block 520. At block 520 the question is asked: "Is this a class 1 user?".

In the event that the answer to the question at block 520 is "no", the parser proceeds to block 522. At block 522 the parser copies to the forwarding vector the following fields: field H/A, field TYPE, field MD, and field UINDEX. Upon completion of the operation at block 522 the parser proceeds to block 524. At block 524 the parser enters "User Validity Filtering".

In the event that the answer at block 520 is "yes", the parser proceeds to block 530. At block 530 the question is asked: "Is the content of the control field, CNTL=UI?". In the event that the answer to the question at block 530 is "no", the parser proceeds to block 532. At block 532 the parser proceeds to "Class 1 XID/Test filtering".

In the event that the answer to the question at block 530 is "yes", the parser proceeds to block 534. At block 534 the "COMMAND bit" is interrogated. In the event that the COMMAND bit indicates that the packet is a COMMAND packet, the parser proceeds to block 536. At block 536 there is copied to the forwarding vector the following fields: the H/A field, the MD field, the TYPE field, and the UINDEX field. Upon completion of the operation at block 536 the parser proceeds to block 538. At block 538 the parser proceeds to User Validity Filtering.

In the event that the answer to the interrogation at block 534 is that the packet is a "response" packet, the parser proceeds to block 540. At block 540 the question is asked: "Is this a discard response packet?". In the event that the answer to the question at block 540 is "yes", the parser proceeds to block 542. At block 542 the parser proceeds to promiscuous user filtering.

In the event that the answer at block 540 is "no", the parser proceeds to block 544. At block 544 there is copied to the forwarding vector the following fields: the H/A field, field MD, field TYPE, and field UINDEX. Upon completion of the operation at block 544 the parser proceeds to block 546, user validity filtering.

Figure 15G:
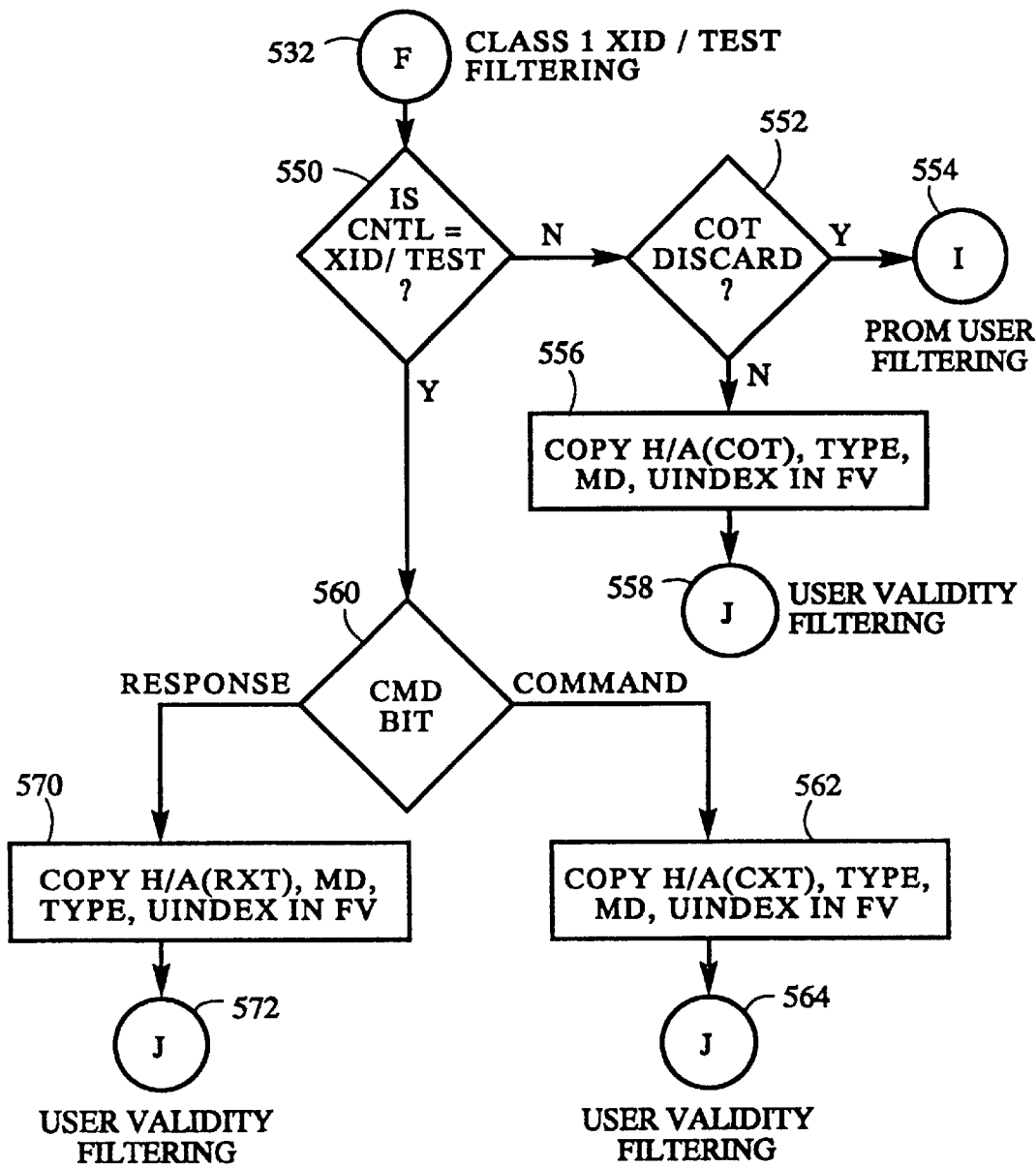

Referring now to FIG. 15G, there is shown block 532. block 532 is also is shown in FIG. 15F. At block 532 the parser enters "class 1" XID/Test filtering.

From block 532 the parser proceeds to block 550. At block 550 the question is asked: "Is CNTL, the CNTL field of the LLC layer header shown in FIG. 5A, =XID/Test?". In the event that the answer to the question at block 550 is "no", the parser proceeds to block 552. At block 552 the question is asked: "Is the packet to be discarded?". In the event that the answer to the question of block 552 is "yes", the parser proceeds to block 554. At block 554 the parser proceeds to promiscuous user filtering.

In the event that the answer to the question at block 552 is "no", then the parser proceeds to block 556. At block 556 the following fields are copied to the forwarding vector: field H/A, field TYPE, field MD, and field UINDEX.

Upon completion of the operation of block 556, the parser proceeds to block 558. At block 558 the parser proceeds to "User Validity Filtering".

In the event that the answer to the question of block 550 is "yes", then the parser proceeds to block 560. At block 560 the command bit, CMD bit as defined in IEEE 802.2, is interrogated. In the event that the CMD bit indicates that the packet is a command packet, the parser proceeds to block 562. At block 562 the following fields are copied to the forwarding vector: field H/A, field TYPE, field MD, and field UINDEX.

Upon completion of the operation of block 562 the parser proceeds to block 564. At block 564 the parser proceeds to "User Validity Filtering".

In the event that the answer to the interrogation at block 560 is that the packet is a response packet, the parser proceeds to block 570. At block 570 the following fields are copied to the forwarding vector: field H/A, field MD, field TYPE, and field UINDEX. Upon completion of the operation of block 570 the parser proceeds to block 572. At block 572 the parser proceeds to "User Validity Filtering".

Figure 15H:
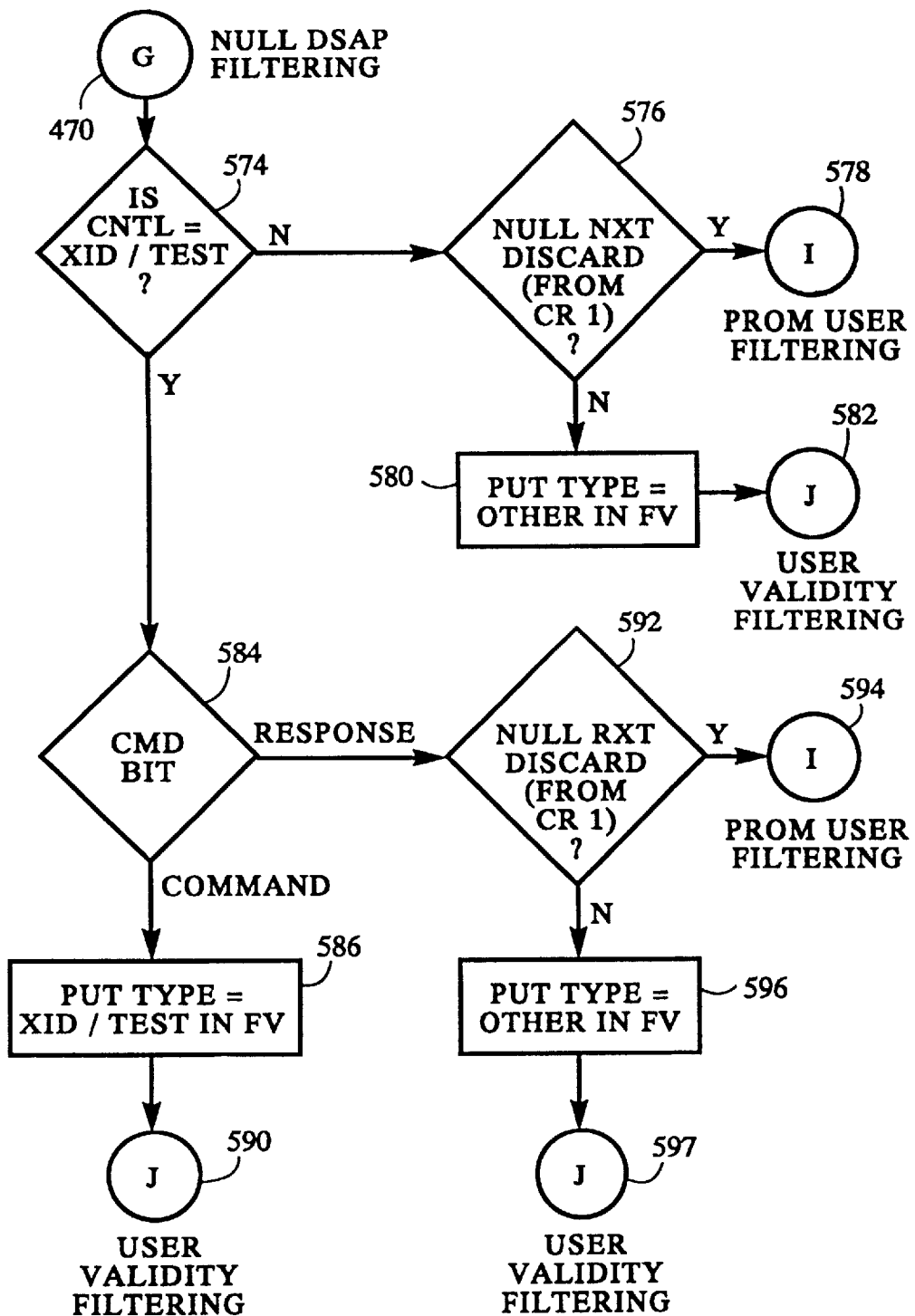

Turning now to FIG. 15H, there is shown block 470. block 470 also is shown in FIG. 15D. At block 470 the parser begins "NULL DSAP Filtering". From block 470 the parser proceeds to block 574.

At block 574 the following question is asked: "Is CNTL= XID/TEST, as defined in IEEE 802.2?". CNTL is the content of CNTL field in the LLC header as shown in FIG. 5A. In the event that the answer to the question in block 574 is "no", then the parser proceeds to block 576.

At block 576 the following question is asked: "Is the frame a null NXT discard?". In the event that the answer to the question at block 576 is "yes", the parser proceeds to block 578. At block 578 the parser proceeds to promiscuous user filtering.

In the event that the answer to the question of block 576 is "no", then the parser proceeds to block 580. At block 580 there is written into the TYPE field of the forwarding vector the value "other". Upon completion of the operation of block 580 the parser proceeds to block 582. At block 582 the parser proceeds to "User Validity Filtering".

Returning now to block 574, in the event that the answer to the question of block 574 is "yes", the parser proceeds to block 584. at block 584 the CMD bit is interrogated. In the event that the result of the interrogation of block 584 is that the packet is a command packet, the parser proceeds to block 586.

At block 586 there is written into the forwarding vector in the TYPE field the value "XID/TEST". Upon the completion of the operations of block 586 the parser proceeds to block 590. At block 590 the parser proceeds to "User Validity Filtering".

In the event that the interrogation at block 584 shows the packet to be a response packet, the parser proceeds to block 592. At block 592 the question is asked: "Is the packet a null RXT discard?". In the event that the answer to the question at block 592 is "yes", the parser proceeds to block 594. At block 594 the parser proceeds to promiscuous user filtering.

In the event that the answer to the question of block 592 is "no", there is written into the forwarding vector at the field, TYPE=the value "other". Upon completion of the operation of block 596 the parser proceeds to block 597. At block 597 the parser proceeds to User Validity Filtering.

Figure 15I:
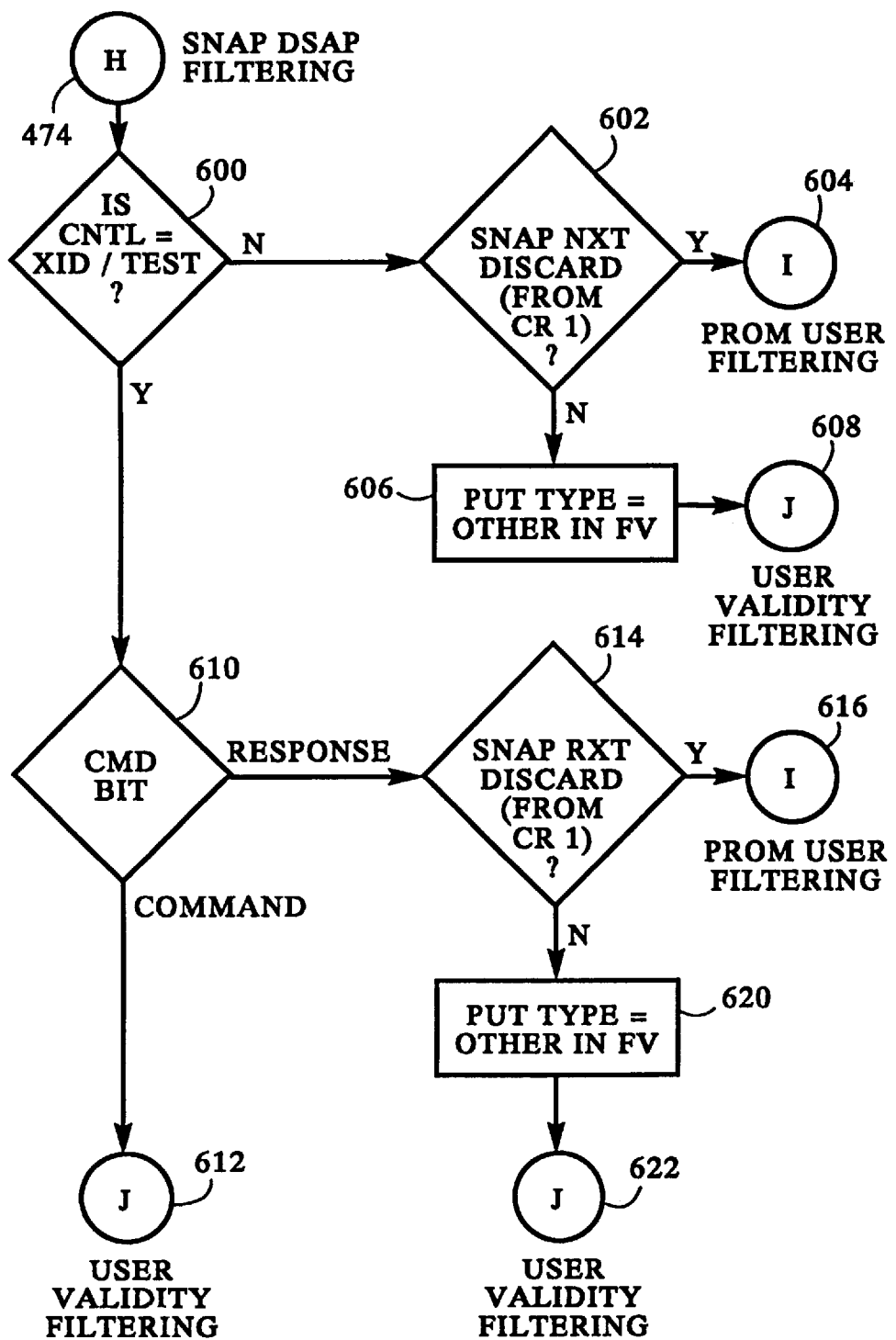

At block 474 as shown in FIG. 15D and also in FIG. 15I, the parser proceeds to block 600. The parser begins SNAP DSAP filtering at block 474.

At block 600 the following question is asked: "Is CNTL= XID/TEST?". In the event that the answer to the question of block 600 is "no", the parser proceeds to block 602. At block 602 the following question is asked: "Is the packet to be discarded?". In the event that the answer to the question at block 602 is "yes", the parser proceeds to block 604. At block 604 the parser proceeds to promiscuous User Filtering.

In the event that the answer to the question at block 602 is "no", the parser proceeds to block 606. At block 606 there is written into the forwarding vector at the field TYPE, the value "other". Upon completion of the operation of block 606 the parser proceeds to block 608. At block 608 the parser proceeds the User Validity Filtering.

In the event that the answer to the question of block 600 is "yes", then the parser proceeds to block 610. At block 610 the CMD bit is interrogated. In the event that the interrogation shows that the command bit indicates that the packet is a command packet, the parser proceeds to block 612. At block 612 the parser proceeds to User Validity Filtering.

In the event that the interrogation of the CMD bit at block 610 shows that the packet is a response packet, the parser proceeds to block 614. At block 614 the question is asked: "Is the SNAP packet to be discarded?". In the event that the answer to the question at block 614 is "yes", the parser proceeds to block 616. At block 616 the parser proceeds to promiscuous user filtering.

In the event that the answer to the question of block 614 is "no", the parser proceeds to block 620. At block 620 there is written into the forwarding vector the field: field TYPE is written as "other". Upon completion of the operation at block 620 the parser proceeds to block 622. At block 622 the parser proceeds to user validity filtering.

Figure 15J:
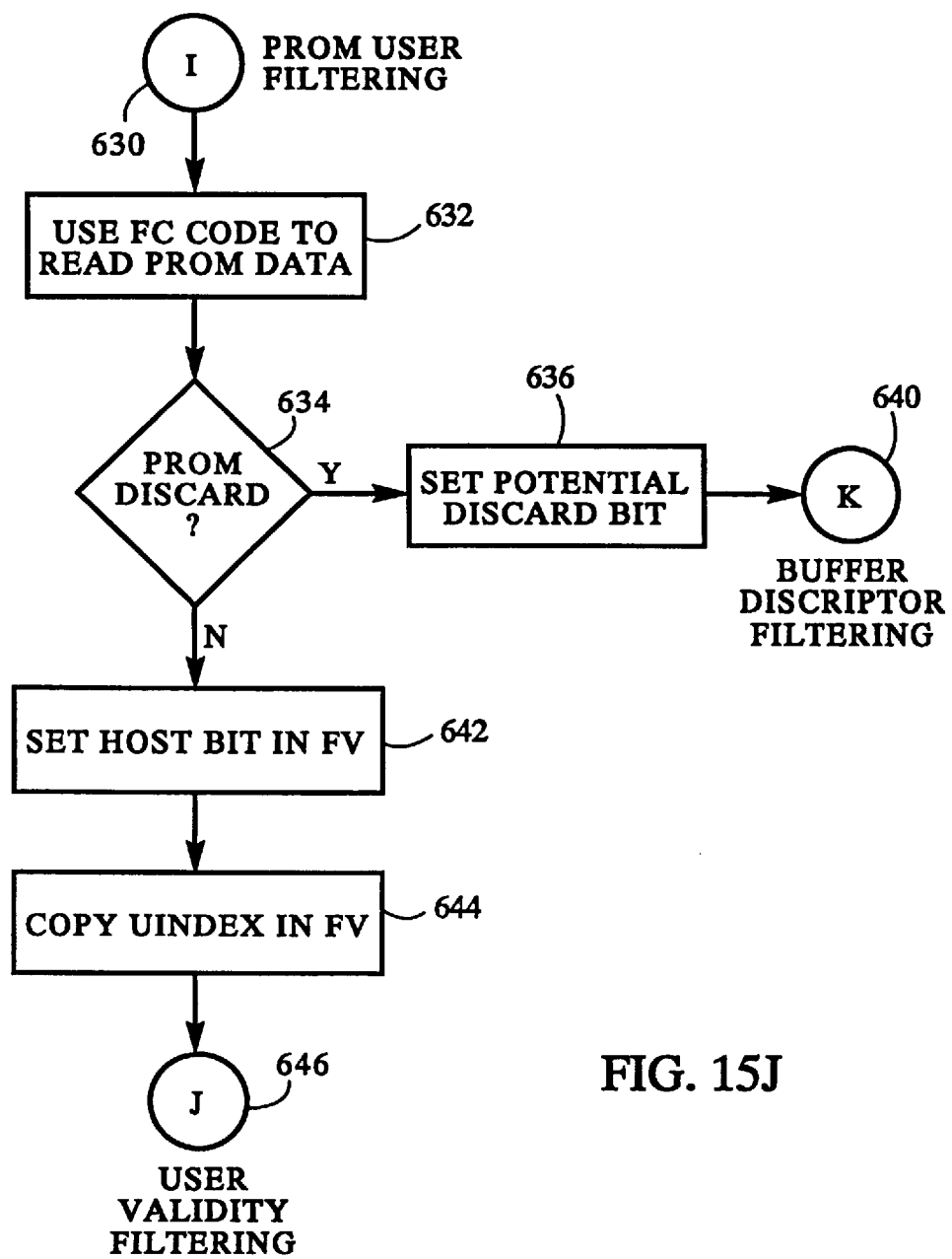

Referring now to FIG. 15J, there is shown the logical flow for promiscuous user filtering. The parser branches to block 630 from all of the previous branches to promiscuous user filtering. From block 630 the parser proceeds to block 632. At block 632 the FC field of the MAC header is used to index, and to read promiscuous data from section 243 of parser database memory. From block 632 the parser proceeds to block 634.

At block 634 the question is asked: "Does the promiscuous data indicate that the package should be discarded?". In the event that the answer to the question at block 634 is "yes", the parser proceeds to block 636.

At block 636 a bit named "POTENTIAL DISCARD BIT" is set. Upon completion of the operation of block 636 the parser proceeds to block 640. At block 640 the parser proceeds to "Buffer Descriptor Filtering".

In the event that the answer to the question at block 634 is "no", the parser proceeds to block 642. At block 642 in the forwarding vector: field HOST is set to indicate that the packet is directed to the Host computer. Upon completion of the operation of block 642 the parser proceeds to block 644.

At block 644 the forwarding vector field: field UINDEX, is copied into the forwarding vector.

Upon completion of the operation of block 644 the parser proceeds to block 646. At block 646 the parser proceeds to user validity filtering.

Figure 15K:
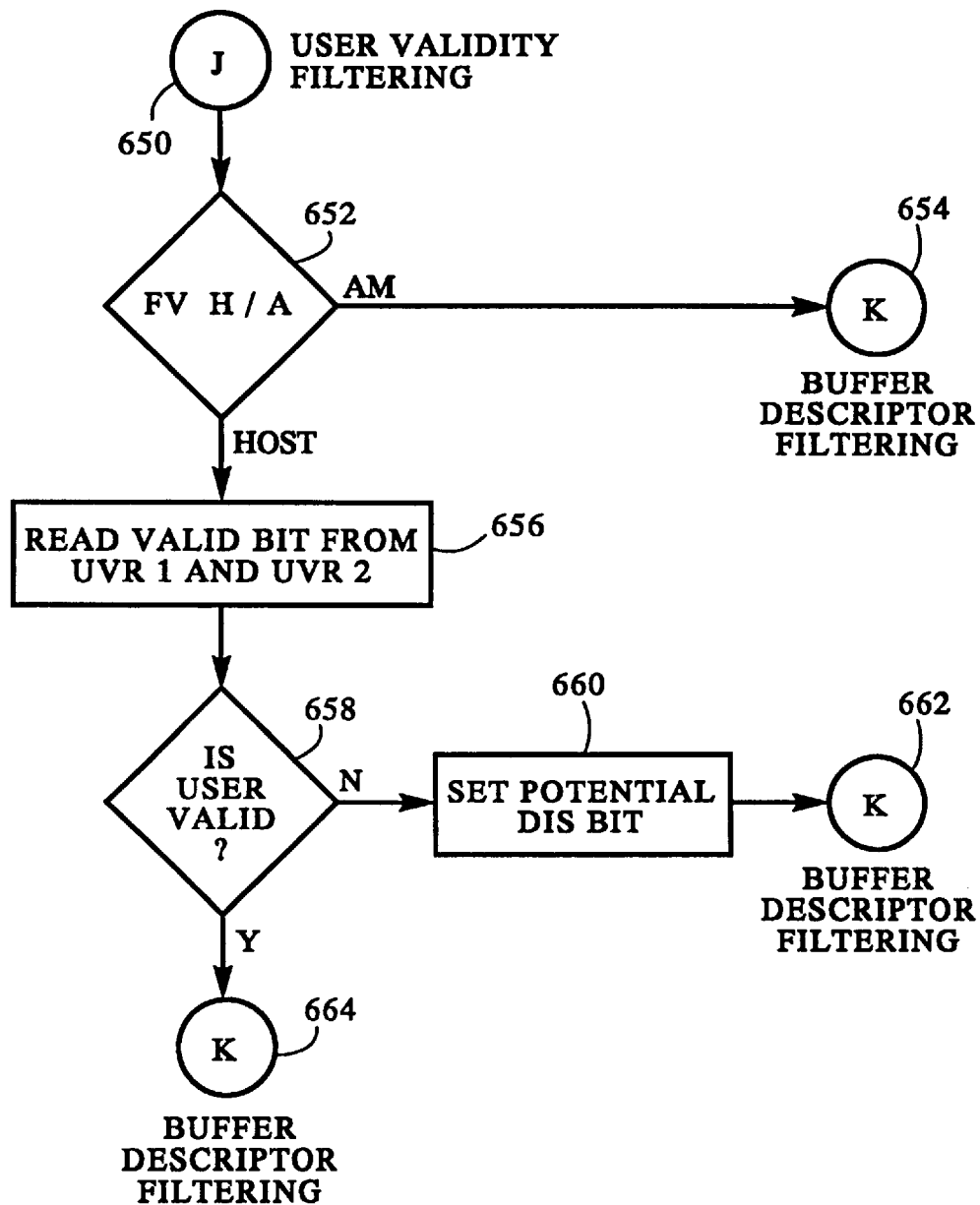

Turning now to FIG. 15K, there is shown the logical flow for user validity filtering. The parser enters user validity filtering at block 650. From block 650 the parser proceeds to block 652. At block 652 the following question is asked: "Is the forwarding vector bit H/A set for adapter manager or host?". In the event that the answer to the question at block 652 is "adapter manager", the parser proceeds to block 654. At block 654 the parser enters "Buffer Descriptor Filtering".

In the event that the answer to the question at block 652 is "host", the parser proceeds to block 656. At block 656 a bit showing whether the user is valid or not is obtained from the parser control and status registers UVR1 and UVR2, in response to the user ID field of the forwarding vector. Upon completion of the operation in block 656, the parser proceeds to block 658. At block 658 the validity of the user is determined by testing the bit. If the user is determined to be invalid, the parser proceeds to block 660.

At block 660 the "POTENTIAL DISCARD BIT" is set. Upon completion of the task at block 660 the parser proceeds to block 662. At block 662 the parser proceeds to buffer descriptor filtering.

In the event that the question at block 658 is answered showing that the user is valid, then the parser proceeds to block 664.

At block 664 the parser proceeds to buffer descriptor filtering.

Figure 15L:
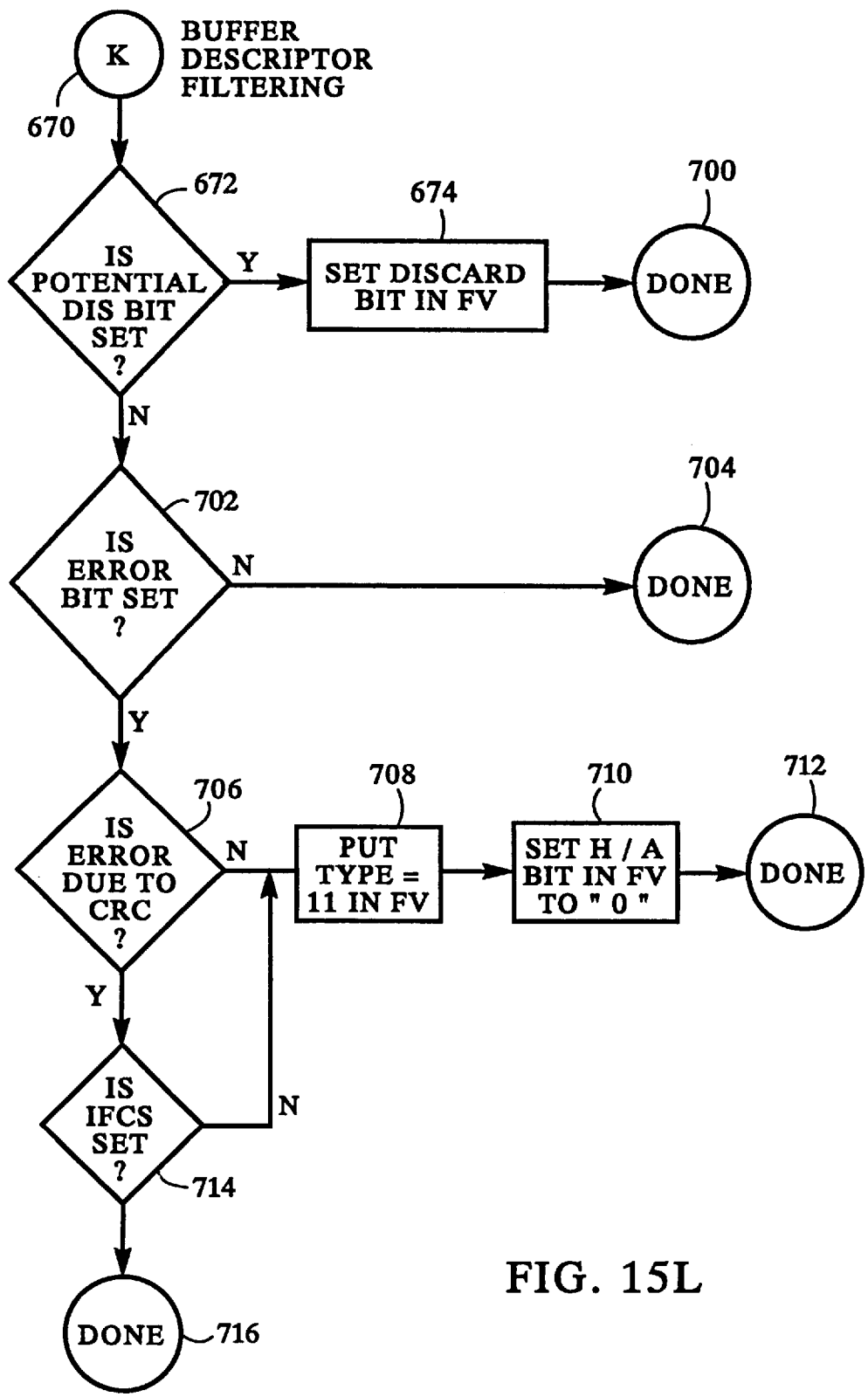

Turning now to FIG. 15L, there is shown a logical flow for buffer descriptor filtering. The parser enters buffer descriptor filtering at block 670. At block 670 the parser proceeds to block 672. At block 672 the following question is asked: "Is the POTENTIAL DISCARD BIT set?". In the event that the answer to the question at block 672 is "yes" the parser proceeds to block 674.

At block 674 the forwarding vector discard field, bit 12 in FIG. 6, is "set". Upon completion of the operation at block 674 the parser proceeds to block 700 and is done filtering for that packet.

In the event that the answer to the question of block 672 is "no", the parser proceeds to block 702. At block 702 the following question is asked: "Is the error bit set, where the error bit is obtained from the buffer descriptor?". In the event that the answer to the question of block 702 is "no", the parser proceeds to block 704 and is done filtering for this packet.

In the event that the answer to the question of block 702 is "yes" the parser proceeds to block 706.

At block 706 the following question is asked: "Is the error due to CRC?". In the event that the answer to the question of block 706 is "no", the parser proceeds to block 708. At block 708 the forwarding vector field TYPE is set equal to 11. Upon completion of block 708 the parser proceeds to block 710.

At block 710 the forwarding vector field H/A is set to "0". Upon completion of the operation in block 710 the parser proceeds to block 712 and is done parsing this frame.

In the event that the answer to the question of block 706 is "yes", the parser proceeds to block 714.

At block 714 the following question is asked: "Is IFCS set, meaning ignore the FCS error from the MAC trailer?". In the event that the answer to the question of block 714 is "no", then the parser proceeds to block 708, block 710, and block 712, where the parser completes the operations at each of those blocks.

In the event that the answer to the question of block 714 is "yes", the parser proceeds to block 716. At block 716 the parser is done this particular frame.

Parser Timing

Figure 16:
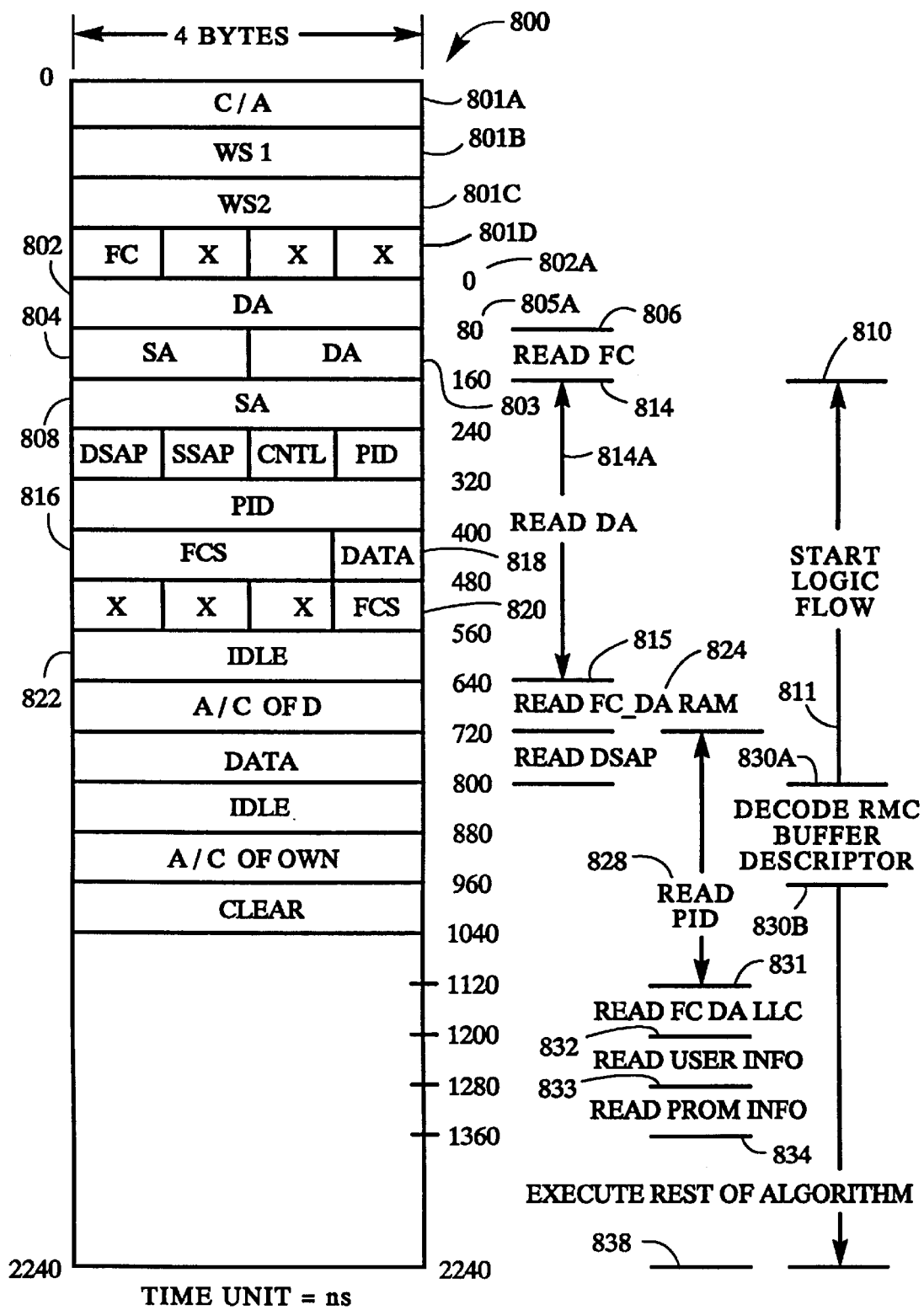
FIG. 16 is a timing diagram for a parser.

Referring now to FIG. 16, there is shown a timing diagram for operation of the parser. Block 800 represents cycles of RMC BUS 172. RMC BUS 172 has a cycle time of 80 nanoseconds. One nanosecond is $10^{**}(-9)$ seconds, and is abbreviated as ns.

As a packet arrives on line 140 (FIG. 3), the bits arrive at, for example, 100 mega bits per second. For example, the FDDI optical fiber databus delivers packets at leg 140 at the rate of 100 mega bits per second. Accordingly, each bit requires a time period of 10 nanoseconds. Therefore, one byte, that is 8 bits, requires 80 nanoseconds to arrive in serial order at leg 140. The bits are transferred through leg 150 to elasticity buffer 160, media access controller 162, and ring memory controller 164. There is an approximately 256 byte first in first out (FIFO) buffer in ring memory controller 164. The approximately 256 byte FIFO stores approximately 256 bytes as they arrive in serial order on leg 140.

After either the arrival of 32 bytes or the arrival of a MAC frame field FS (FIG. 5A) indicating the end of a frame of less than 32 bytes, ring memory controller 164 begins writing to RMC BUS 172 with an 80 nanosecond cycle time, and writes four bytes in parallel. The FIFO buffer is read to the RMC bus 172 for transfer to the packet memory controller 188 and packet memory 190. RMC BUS 172 is a 32 bit wide parallel bus, and so transfers four bytes per 80 nanosecond cycle. Accordingly, 32 bytes of the FIFO buffer are transferred in eight (8) bus cycles, or 8*80 ns=640 ns. It required 32*80 ns per byte=2,560 ns to receive the 32 bytes from the local area network.

Returning now to a discussion of FIG. 16, block 800 represents cycles on the RMC BUS 172. At cycle 801A, a command/address cycle is performed to indicate that a new packet has arrived and that the transfer of that packet on the RMC bus is beginning.

At cycles 801B and 801C the RMC BUS is in an idle state. At cycle 801D the FC Field (FIG. 5A) of the MAC header is written to RMC BUS 172 by the ring memory controller 164. At time 0, indicated by numeral "0" 802A, the ring memory controller 164 signals data ready on RMC BUS 172.

At the event that data ready for an FC Field is signalled on RMC BUS 172, the timing of the parser begins with numeral "0" 802A. Further events in the parser are tied to RMC BUS cycles because the parser snoops on the RMC BUS. During cycle 802 four bytes of the DA Field of the packet are written to RMC BUS 172, and at 80 nanoseconds, time 805A, the RMC BUS 172 signals data ready for cycle 802. Also at 80 nanoseconds the parser 180 begins reading the parser database 182 data for FC parsing, as indicated at line 806. This read is indicated at block 402 of FIG. 15A. During the RMC BUS 172 cycle from 80 nanoseconds to 160 nanoseconds the parser 180 completes the read of parser database 182 for FC parsing data.

During the cycle between 80 nanoseconds and 160 nanoseconds, two bytes of DA Field 803 are appended to the four bytes of DA Field from cycle 802. Also during the cycle from 80 nanosecond to 160 nanoseconds of RMC BUS 172, two bytes 804 of SA address are written to RMC BUS 172. At 160 nanoseconds data ready for the two bytes of DA 803 and the two bytes of SA 804 are signalled "ready".

Also at 160 nanoseconds the parsing logic flow begins as indicated by line 810. The parsing logic flow continues as indicated by arrow 811.

During the RMC BUS 172 cycle between 160 nanoseconds and 240 nanoseconds, four bytes of SA Field 808 are appended to the earlier two bytes of SA Field 804.

During the cycle between 240 nanoseconds and 320 nanoseconds of the RMC BUS 172, the four bytes transferred on the RMC BUS 172 are DSAP, SSAP, CNTL, and one byte of the PID Field (FIG. 5A).

During the RMC BUS 172 cycle between 320 nanoseconds and 420 nanoseconds the four remaining bytes of the PID Field are written to RMC BUS 172 by ring memory controller 164.

During the RMC BUS 172 cycle between 400 nanoseconds and 480 nanoseconds one byte of DATA 818 is written to the RMC BUS. Also between 400 and 480 nanoseconds the FCS Field from the MAC trailer 816 is written to the RMC BUS 172.

During the RMC BUS 172 cycle between 480 nanoseconds and 560 nanoseconds, the last byte of the FCS Field 820 is written to the RMC BUS 172.

After 560 nanoseconds the RMC BUS enters a sequence of idle activity.

The parser begins reading DA information from parser database 182 at the 160 nanosecond time point, as shown by line 814. This read is also shown in block 412 of FIG. 15B. The parser utilizes six RMC BUS cycles to decode the six bytes of DA Field information from the packet, and completes the DA comparison at 640 nanosecond as shown by line 815 and arrow 814A. In decoding the DA field, the parser uses one RMC BUS cycle to decode one byte of DA Field from a packet, for a total of six (6) RMC BUS cycles.

At 640 nanosecond the parser reads the FC_DA information from the parser database 182, that is section 236 (FIG. 5B) of parser database memory, as shown at notation 824. This read is also shown at block 440 of FIG. 15C.

At the time point of 720 nanosecond the parser determines if the content of the DSAP Field of the packet is AA, and if the content of the SSAP Field is=AA, and if the CNTL Field=UI. In the event that the above test indicates that the DSAP Field contains AA, the SSAP Field contains AA, and the CNTL Field contains UI than the packet is a SNAP SAP packet, and therefore a PID Field exists. The test of the DSAP, the SSAP, and the CNTL Field is concluded at about 720 nanosecond.

At 720 nanosecond the parser either reads the DSAP decode information at section 238 of parser database memory also shown at block 426 of FIG. 15D, or the parser reads the PID decode information from the parser database memory at section 240 (FIG. 5B), as also shown at block 462 of FIG. 15D.

In the event that the parser determines that the packet is a SNAP SAP packet the parser reads the PID section 240 (FIG. 5B) of parser database memory during the time interval between 720 nanoseconds and 1120 nanosecond. This read of the PID section 240 requires five (5) cycles of the RMC BUS 172.

At 800 nanosecond the RMC buffer descriptor is written to the RMC BUS 172 by the ring memory controller 164, and is available to the parser at approximately 960 nanosecond, as shown by line 830A and line 830B.

During the RMC BUS cycle between 1120 nanosecond and 1200 nanoseconds the parser reads the FC_DA LLC decode data from the parser database memory at section 242. This read is also shown at block 506 of FIG. 15E. This read requires one 80 nanosecond RMC BUS cycle between 1120 nanosecond and 1200 nanosecond, as shown by lines 831 and 832.

During the RMC BUS 172 cycle between 1200 nanosecond and 1280 nanoseconds the parser reads user information from section 243 of the parser database (FIG. 5B) for UINDEX filtering, as shown by line 832 and by line 833.

During the RMC BUS cycle between 1200 nanoseconds and 1360 nanoseconds the parser reads promiscuous user information from section 243 of the parser database memory (FIG. 5B), as shown by lines 833 and 834. This read is also shown at block 632 of FIG. 15J.

At 2240 nanoseconds, as shown by line 838, the parser completes execution of its logic flow. Following completion of the parser logic flow at 2240 nanoseconds, the parser writes the forwarding vector onto line 184 for receipt by logic block 186 (FIG. 3).

In the above illustration from FIG. 16, the parser completed decoding a minimum size LLC SNAP SAP packet within 2240 nanoseconds. For example, the packet in the illustration had one byte 818 of data. As another example, the packet may have no data byte. However, the RMC bus always has the FCS bytes 816, and so has the cycle between 400 ns and 480 ns.

A packet with no bytes of data is a minimum packet size in, for example, an FDDI 100 megabit per second local area network.

For example, assume a minimum SNAP SAP LLC packet size of 35 bytes (PRE 7+SD 1+FC 1+DA 6+SA 6+DSAP 1+SSAP 1+CNTL 1+PID 5+FCS 4+ED ½+FS 1½). The time required to receive the 35 bytes of data on leg 140 is: 80 ns per byte*35 bytes=2800 ns. The total time for the parser to filter this 35 byte packet is 2240 ns. That is, the parser is faster than the arrival rate of minimum size LLC packets.

Accordingly, this real time parser is able to decode packets at wire speed, and maintain currency at the maximum arrival rate of packets.

Figure 17:
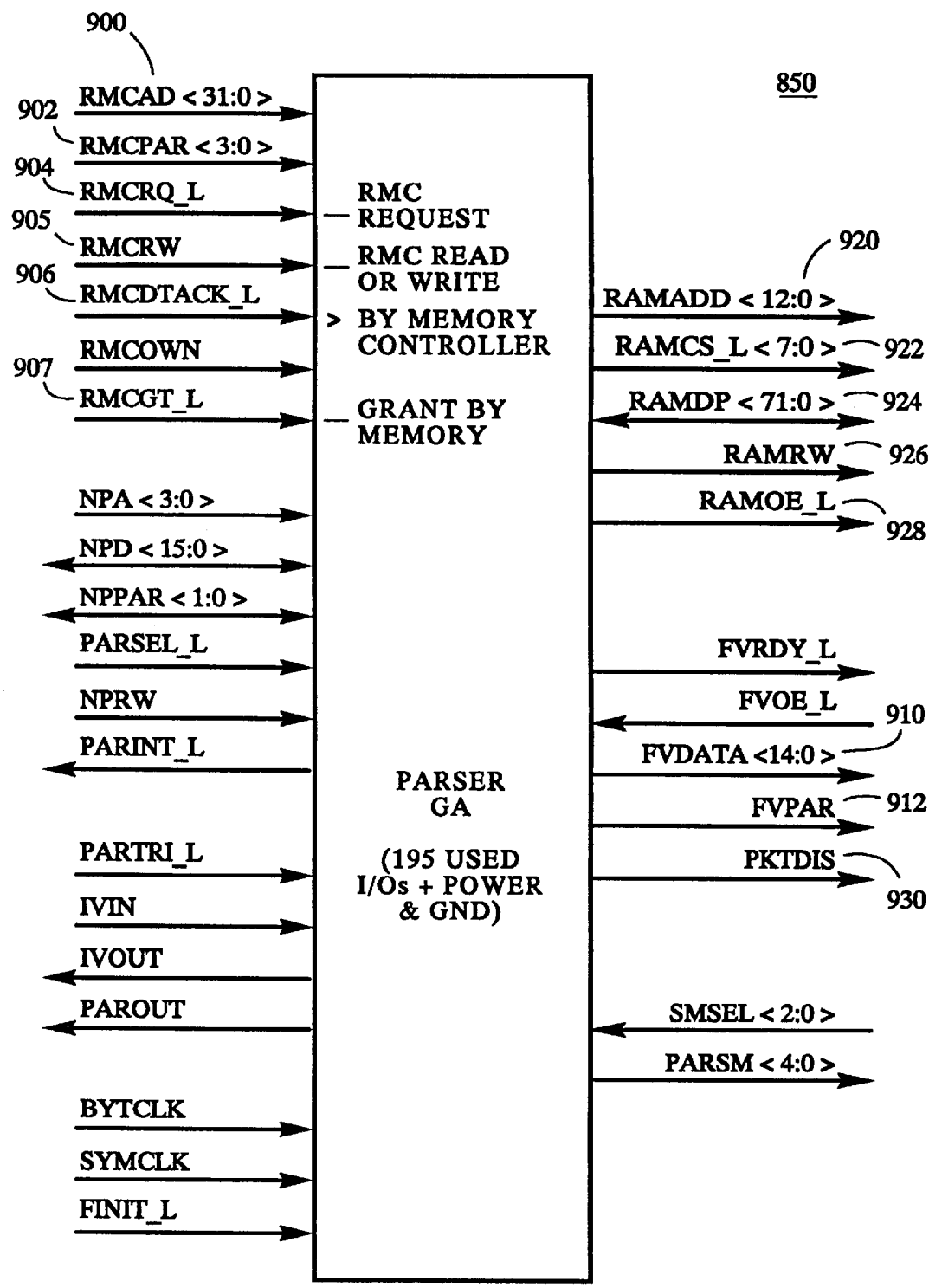
FIG. 17 is a connection diagram for a parser gate array.

Turning now to FIG. 17, there is shown a connection diagram for parser gate array 850. Parser gate array 850 shown in FIG. 17 is the single chip implementation of parser 180 shown in FIG. 3. The RMC bus 172 is shown occupying 32 bits at connection 900 of gate array 850. The RMCPAR lines 902 are three parity check lines.

The RMCRQ_L line 904 carries the request by the ring memory controller 164 for the rmc bus 172. The RMCGT_L lines 907 carry the grant signal generated by the packet memory controller 188, where the grant signal grants access to the RMC bus by the ring memory controller 164.

The forwarding vector line 184 occupies 15 bits for data at connection 910, and a parity line at connection 912.

The parser database 182 static RAM chip, an SRAM, connects to the parser gate array 850 through the following connection lines: lines 920 carrying 13 bits; lines 922 carrying 8 bits; lines 924 carrying 72 bits; lines 926 and lines 928.

Packet Discard line PKTDS line 930, when asserted, causes the packet memory controller 188 to discard a packet, and not transfer the packet to packet memory 190. That is, the packet is dropped into a bit bucket by the packet memory controller 188 when line 930 is asserted. Line 930 is asserted by the parser as soon as the logic flow in the parser (FIGS. 15A–FIG. 15L) determines that the packet needs to be discarded. This early detection, dumping to the bit bucket, saves bandwidth on the packet memory bus 193. In addition to saving bandwidth, this early detection of the discard condition saves lifetime of packet memory 190.

Additional lines connect to the parser gate array but are not explicitly discussed herein. Those skilled in the art of computer design will recognize and be able to implement other standard connections to a gate array.

What is claimed is:

1. A parser for use in a station on a computer network, said station receiving a first packet from the computer network, said first packet being a stream of bits, said bits arranged in a plurality of fields of said first packet, said parser for interpreting said bits of said first packet, comprising:

a station memory;

a set of logic circuits implemented in a computer chip;

a memory interacting with said computer chip, said memory providing first data to said set of logic circuits;

means for reading said bits from said plurality of fields of said first packet into said set of logic circuits, said bits providing second data to said set of logic circuits;

means, responsive to said first data and said second data, to create a forwarding vector to be used by said logic circuits to determine a destination for the first packet and to forward said packet to the station if the packet has a destination address which matches a host destination address and to discard said packet if said destination address does not match said host destination address, wherein the station either forwards or discards the packet without reading the entire packet into said station memory.

2. The apparatus as in claim 1 wherein said computer chip is an application specific integrated circuit (ASIC).

3. The apparatus as in claim 1 wherein said memory further comprises a contentent addressable memory (CAM).

4. The apparatus as in claim 3 wherein said content addressable memory is a static random access memory chip (SRAM).

5. The apparatus as in claim 1 further comprising:

means for writing said first data to said memory after parsing said first packet and before parsing a second packet.

6. The apparatus as in claim 5 further comprising:

an adapter manager microprocessor;

means for said adapter manager microprocessor to write at least some of said first data to said memory dynamically after parsing for said first packet is complete and before beginning parsing said second packet.

7. The apparatus as in claim 1 further comprising:

packet memory for storing said first packet;

means for determining that a particular packet is to be discarded and not stored in packet memory;

means, responsive to a determination that said particular packet is to be discharged, for asserting an electrical signal to prevent storage of said particular packet in said packet memory.

8. The apparatus as in claim 1 wherein said forwarding vector further comprises a parity check field, a discard field, a destination field, a packet type field, a user field and a recipient process field.

9. A network adapter in a computer network, the network adapter receiving a first packet from the computer network, the first packet having a plurality of fields, the plurality of fields including packet header fields and a plurality of other fields, the header fields containing destination address data, the network adapter comprising:

an adapter memory;

a parser database providing network data;

a parser to examine the header fields of the first data packet and to compare the contents of each said header field of the first data packet with said network data in said parser database, said parser to create a forwarding vector in response to the contents of the examined header fields and said network data, said forwarding vector to be used by the network adapter to determine a destination for the first packet and to forward said packet to a host if the packet has a destination address which matches a host destination address and to discard said packet if said destination address does not match said host destination address, wherein the adapter either forwards or discards the packet without reading the entire packet into said adapter memory.

10. The network adapter of claim 9, further comprising:

a packet memory controller using said forwarding vector to control disposition of the first packet.

11. The network adapter of claim 9, wherein the first packet is longer than 512 bytes and is stored in a plurality of pages and a forwarding vector is generated for each said page.

12. The network adapter of claim 9, wherein said parser database is dynamically changed by said host.

13. The network adapter of claim 9, wherein said first packet includes a destination address field, said destination address field having a plurality of bit masks, said parser using a logical OR operation on said plurality of bit masks, a resultant of "zero" of said logical OR operation indicating a valid destination address in said destination address field.

* * * * *